United States Patent
Egashira et al.

(10) Patent No.: US 10,511,202 B2
(45) Date of Patent: Dec. 17, 2019

(54) ROTATING ELECTRIC MACHINE

(71) Applicant: Mitsubishi Electric Corporation, Chiyoda-ku, Tokyo (JP)

(72) Inventors: Kohei Egashira, Tokyo (JP); Atsushi Sakaue, Tokyo (JP); Tatsuro Hino, Tokyo (JP); Shinkichi Sawa, Tokyo (JP); Masashi Nakamura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 311 days.

(21) Appl. No.: 15/541,766

(22) PCT Filed: Feb. 23, 2016

(86) PCT No.: PCT/JP2016/055266
§ 371 (c)(1),
(2) Date: Jul. 6, 2017

(87) PCT Pub. No.: WO2016/136743
PCT Pub. Date: Sep. 1, 2016

(65) Prior Publication Data
US 2018/0278111 A1    Sep. 27, 2018

(30) Foreign Application Priority Data
Feb. 26, 2015 (JP) .................... 2015-036069

(51) Int. Cl.
*H02K 3/38* (2006.01)
*H02K 3/34* (2006.01)
(Continued)

(52) U.S. Cl.
CPC .......... *H02K 3/38* (2013.01); *H02K 1/16* (2013.01); *H02K 3/12* (2013.01); *H02K 3/28* (2013.01); *H02K 3/34* (2013.01)

(58) Field of Classification Search
CPC .. H02K 3/38; H02K 1/16; H02K 3/12; H02K 3/28; H02K 3/34
See application file for complete search history.

(56) References Cited

U.S. PATENT DOCUMENTS 5,659,219 A * 8/1997 Momose .............. H02K 3/38
                                                        29/596
8,125,118 B2 * 2/2012 Nissen .................. H02K 3/38
                                                        310/214
(Continued)

FOREIGN PATENT DOCUMENTS

JP    2010-237939 A    10/2010
JP    2011-239653 A    11/2011
(Continued)

OTHER PUBLICATIONS

Office Action (Notification of Reasons for Refusal) dated Nov. 7, 2017, by the Japanese Patent Office in corresponding Japanese Patent Application No. 2017-502387, and an English Translation of the Office Action. (6 pages).
(Continued)

*Primary Examiner* — Robert W Horn
(74) *Attorney, Agent, or Firm* — Buchanan Ingersoll & Rooney PC

(57) ABSTRACT

Slot accommodation portions of single coils forming an armature coil are arranged so as to be stacked in the radial direction in a slot. On the anti-wire-connection side, a one-side extending portion which is a coil end extending from the slot accommodation portion in the first layer, and a one-side extending portion which is a coil end extending from the slot accommodation portion in the second layer, extend in the same direction. No insulation sheet is provided in intervals between coil ends extending in the same direc-
(Continued)

tion, such as the extending portions (23*b*) and (21*b*) and extending portions (21*d*) and (22*d*).

7 Claims, 24 Drawing Sheets

(51) Int. Cl.
*H02K 1/16* (2006.01)
*H02K 3/12* (2006.01)
*H02K 3/28* (2006.01)

(56) References Cited

U.S. PATENT DOCUMENTS

| | | | | |
|---|---|---|---|---|
| 9,647,504 B2 * | 5/2017 | Bihari | ................... | H02K 3/34 |
| 9,705,374 B2 * | 7/2017 | Hino | ................... | H02K 3/12 |
| 9,882,445 B2 * | 1/2018 | Coldwate | ................ | H02K 3/34 |
| 9,979,265 B2 * | 5/2018 | Hattori | ................... | H02K 3/38 |
| 10,158,266 B2 * | 12/2018 | Mitsui | ................... | H02K 3/32 |
| 2015/0022045 A1 | 1/2015 | Hagiwara et al. | | |
| 2015/0171693 A1 * | 6/2015 | Sakaue | ................... | H02K 3/38 |
| | | | | 310/215 |
| 2018/0278111 A1 * | 9/2018 | Egashira | ................ | H02K 3/34 |

FOREIGN PATENT DOCUMENTS

| JP | 2013-158222 A | 8/2013 |
|---|---|---|
| WO | WO 2014/034723 A1 | 3/2014 |

OTHER PUBLICATIONS

*International Search Report (PCT/ISA/210) dated May 17, 2016, by the Japanese Patent Office as the International Searching Authority for International Application No. PCT/JP2016/055266.
*Written Opinion (PCT/ISA/237) dated May 17, 2016, by the Japanese Patent Office as the International Searching Authority for International Application No. PCT/JP2016/055266.

* cited by examiner (a)

(b)

(a)

(b)

(a)

(b)

(a)

(b)

60

(a)

(b)

ROTATING ELECTRIC MACHINE

TECHNICAL FIELD

The present invention relates to a rotating electric machine, in particular, to the insulation structure of coil ends of armature windings of the rotating electric machine.

BACKGROUND ART

In recent years, rotating electric machines such as motors and electric generators have been required to have a small size, high output, and high quality. In such a rotating electric machine required to have high output, high voltage is applied and therefore there is a great potential difference between winding bodies forming the armature windings, in particular, at coil ends.

Accordingly, a high-quality and high-output rotating electric machine is proposed in which insulation sheets are provided between the coil ends of the winding bodies to improve a dielectric strength at the coil ends (see, for example, Patent Document 1).

In addition, a high-quality, small-sized, and high-output rotating electric machine is proposed in which the thickness in the radial direction of conductive wires at a coil end parts is designed to be small to increase the thickness of insulators, thereby the dielectric strength is improved (see, for example, Patent Document 1).

CITATION LIST

Patent Document

Patent Document 1: International Publication No. 2014/034723 (pp. 14-16, FIG. 27, FIG. 33)

SUMMARY OF THE INVENTION

Problems to be Solved by the Invention

In a rotating electric machine in which insulation sheets are provided between coil ends of winding bodies as described in Patent Document 1, since insulation sheets are provided among all layers of coil ends, the use amount of insulation sheets increases, thus a problem exists in that the manufacturing cost is increased.

In addition, there is a problem that the number of processes for providing insulation sheets to the coil ends increases and therefore it is difficult to improve the productivity.

In addition, in order to improve the dielectric strength of coil ends in response to requirement for further high output, it is necessary to increase the thickness of insulation sheets, and therefore the thickness in the radial direction of coil ends of the armature winding increases, and a problem exists in that the size of the rotating electric machine is increased.

In addition, in the rotating electric machine in which the thickness in the radial direction of conductive wires at coil end parts is designed to be small as described in Patent Document 1, it is possible to increase the thickness of insulation sheets without increasing the thickness in the radial direction of coil ends, and the dielectric strength of winding bodies can be further improved.

However, this rotating electric machine also has a problem that the manufacturing cost increases because a large amount of insulation sheets is used, and a problem that it is difficult to improve the productivity because the number of processes for providing insulation sheets increases.

In addition, since coil end parts of the winding bodies need to be machined, there is a problem that the number of manufacturing processes greatly increases and therefore it is difficult to improve the productivity.

The present invention has been made to solve the above problems, and an object of the present invention is to obtain a rotating electric machine that achieves improvement in the dielectric strength at coil ends of armature windings (hereinafter, referred to as armature coils), reduction in the use amount of insulation sheets, and decrease in the number of manufacturing processes, and that achieves high quality, size reduction, high output, cost reduction, and high productivity.

Means of Solution to the Problems

A first rotating electric machine according to the present invention includes an armature; and a rotor rotatably arranged on an inner circumferential side of the armature with a gap interposed therebetween. The armature includes an armature core, armature coils mounted to the armature core, and phase to phase insulators for insulating coil end parts of the armature coils. The armature coils are formed such that $(4n+2)$ number of slot accommodation portions of single coils forming the armature coils are arranged so as to be stacked in a radial direction in slots of the armature core, n being a natural number. On an anti-wire-connection side, a coil end extending in a circumferential direction from the slot accommodation portion in a first layer on an innermost side in the radial direction in the slot and a coil end extending in the circumferential direction from the slot accommodation portion in a second layer extend toward the same direction, or a coil end extending in the circumferential direction from the slot accommodation portion in a $(4n+1)$th layer and a coil end extending in the circumferential direction from the slot accommodation portion in a $(4n+2)$th layer extend toward the same side. The phase to phase insulators are provided between the coil ends that extend toward directions opposite to each other in the circumferential direction and are adjacent in the radial direction, and the phase to phase insulator is not provided between the coil ends that extend toward the same direction in the circumferential direction and are adjacent in the radial direction.

A second rotating electric machine according to the present invention includes an armature; and a rotor rotatably arranged on an inner circumferential side of the armature with a gap interposed therebetween. The armature includes an armature core, armature coils mounted to the armature core, and phase to phase insulators for insulating coil end parts of the armature coils. The armature coils are formed such that $(4n+2)$ number of slot accommodation portions of single coils forming the armature coils are arranged so as to be stacked in a radial direction in slots of the armature core, n being a natural number. In each single coil, the slot accommodation portions forming the first to $(4n+2)$th layers are formed by one continuous conductive wire. On an anti-wire-connection side, coil ends extending in a circumferential direction from the slot accommodation portions in the $(4n)$th layer and the $(4n+1)$th layer extend toward the same direction as a coil end extending in the circumferential direction from the slot accommodation portion in the first layer, coil ends extending in the circumferential direction from the slot accommodation portions in the second layer, the $(4n-1)$th layer, and the $(4n+2)$th layer extend toward a direction opposite to the coil end extending in the circumferential direction from the slot accommodation portion in the first layer. The phase to phase insulators are provided between the coil ends that extend toward directions opposite to each other in the circumferential direction and are adjacent in the radial direction, and the phase to phase insulator is not provided between the coil ends that extend toward the same direction in the circumferential direction and are adjacent in the radial direction.

Effect of the Invention

The first and second rotating electric machines according to the present invention have coil ends that are adjacent in the radial direction and extend toward the same direction in the circumferential direction from the slot accommodation portions. Therefore, the number of insulation sheets which are phase to phase insulators at the coil ends can be decreased, thus high quality, a small size, and high output can be achieved, and cost reduction and productivity can be improved.

EMBODIMENTS FOR CARRYING OUT THE INVENTION

Hereinafter, a rotating electric machine according to the present invention will be described with reference to the drawings.

In the present invention, a circumferential direction, a radial direction, and an axial direction respectively indicate the circumferential direction, the radial direction, and the axial direction of an armature or the rotating electric machine, unless otherwise specified.

Embodiment 1

Figure 1:
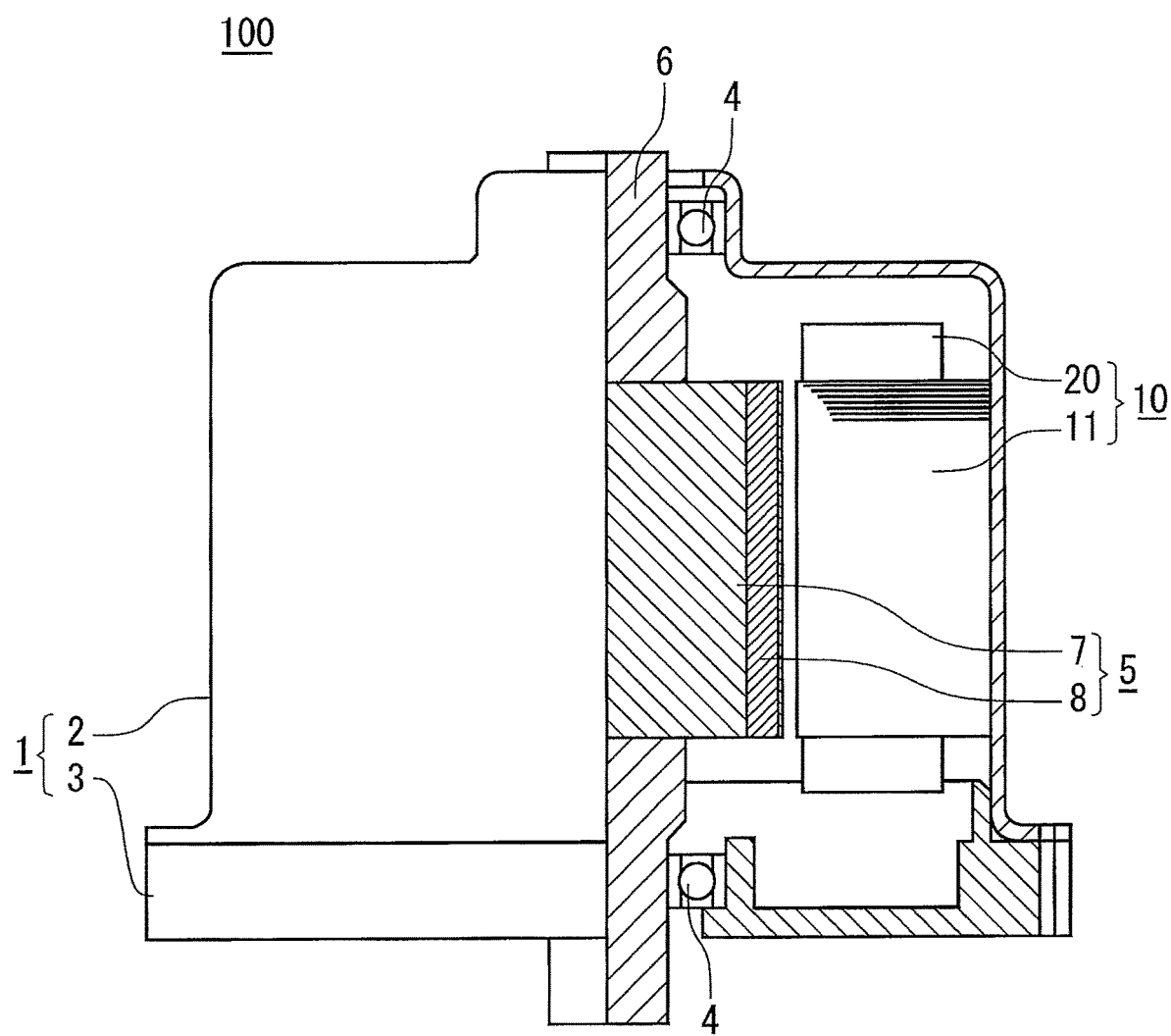
FIG. 1 is a schematic one-side sectional view of a rotating electric machine according to embodiment 1 of the present invention.

FIG. 1 is a schematic one-side sectional view of the rotating electric machine according to embodiment 1 of the present invention.

Figure 2:
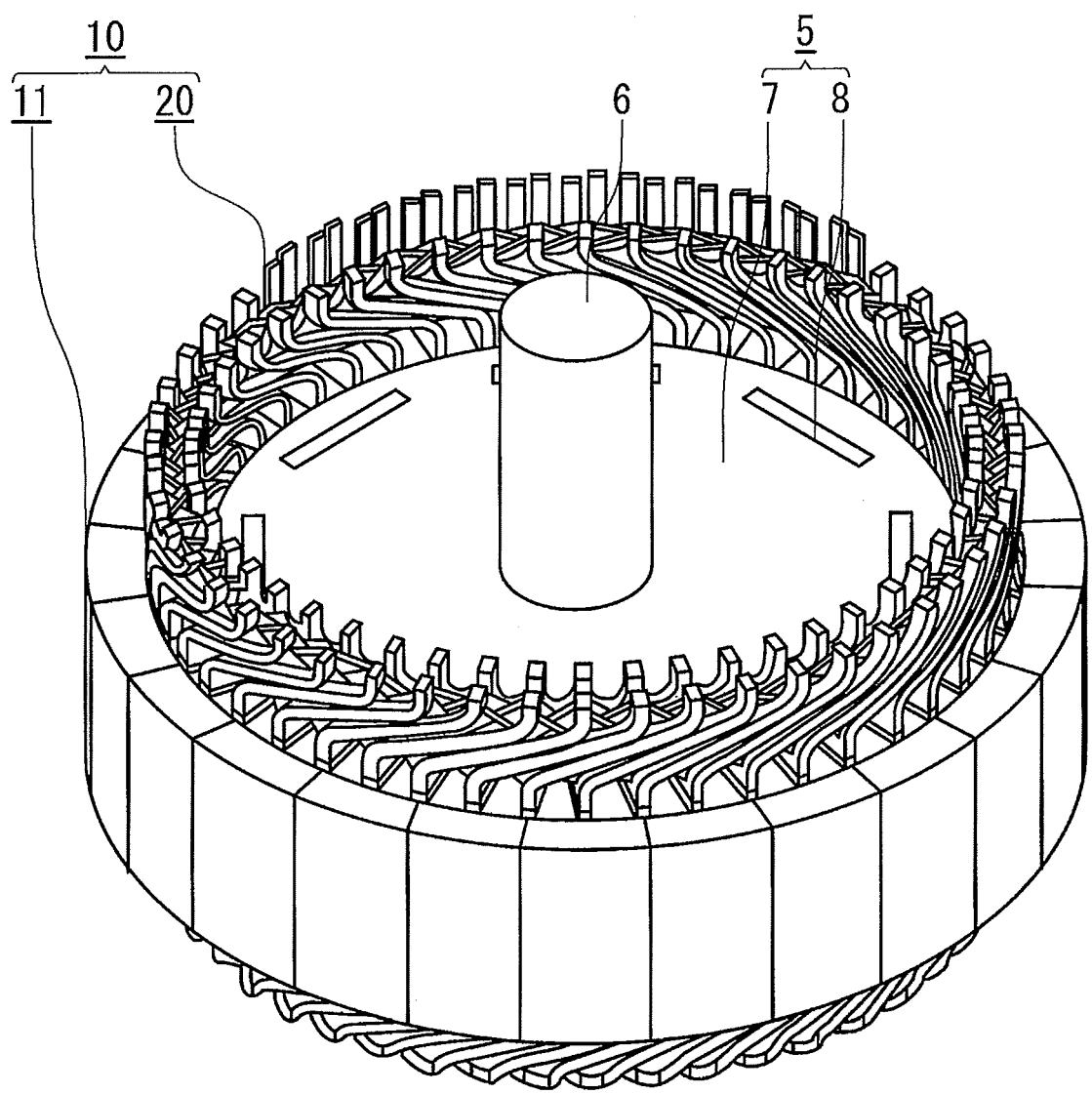
FIG. 2 is a schematic perspective view showing a major part of the rotating electric machine according to embodiment 1 of the present invention.

FIG. 2 is a schematic perspective view showing a major part of the rotating electric machine according to embodiment 1 of the present invention.

As shown in FIG. 1 and FIG. 2, the rotating electric machine 100 of the present embodiment includes: a housing 1 having a bottomed cylindrical frame 2 and an end plate 3 closing the opening of the frame 2; an armature 10 fixed by being fitted into the cylinder part of the frame 2; and a rotor 5 provided on the inner circumferential side of the armature 10 with a gap therebetween.

The rotor 5 is a permanent magnet rotor having a rotor core 7 fixed to a rotation shaft 6 inserted at the axis position, and permanent magnets 8 embedded on the outer circumferential side of the rotor core 7. The rotation shaft 6 is rotatably supported via bearings 4 by the bottom part of the frame 2 and the end plate 3.

The rotor in the present embodiment is a permanent magnet rotor, but without limitation thereto, a cage rotor or a winding rotor may be used.

Figure 3:
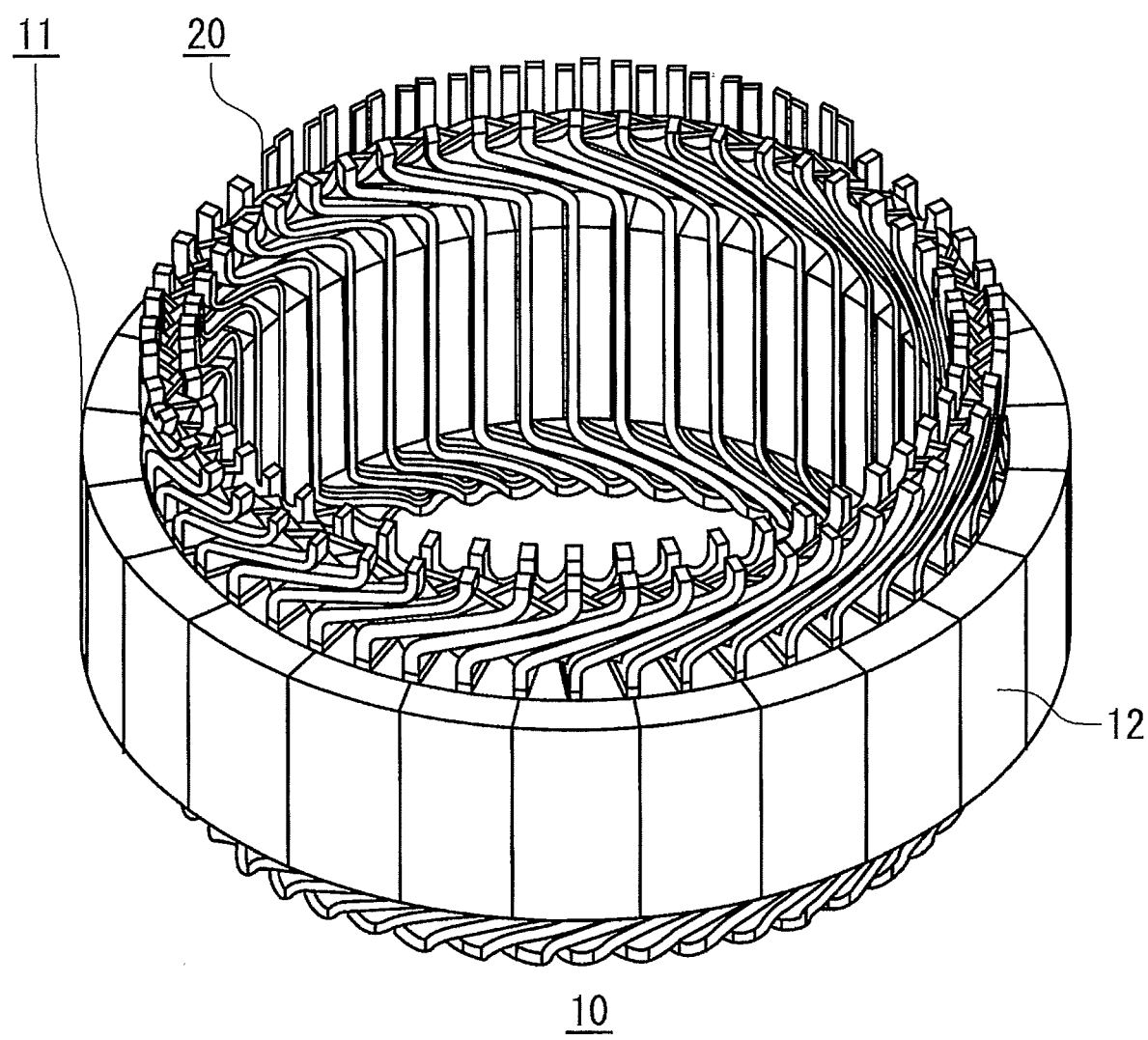
FIG. 3 is a schematic perspective view of an armature of the rotating electric machine according to embodiment 1 of the present invention.

FIG. 3 is a schematic perspective view of the armature of the rotating electric machine according to embodiment 1 of the present invention.

As shown in FIG. 3, the armature 10 in the present embodiment includes: an armature core 11; armature coils 20 mounted to the armature core 11; phase-to-phase insulators (not shown in FIG. 3) for insulating coil end parts of the armature coils 20; and a ground insulator (not shown in FIG. 3) for insulating the armature coils 20 and the armature core 11 from each other.

Although described in detail later, the armature coils 20 are formed by winding conductive wires, and generate magnetic field by being energized. The magnetic flux of the generated magnetic field passes through the armature core 11.

The armature core 11 is formed by arranging core blocks 12 annularly in the circumferential direction.

Figure 4:
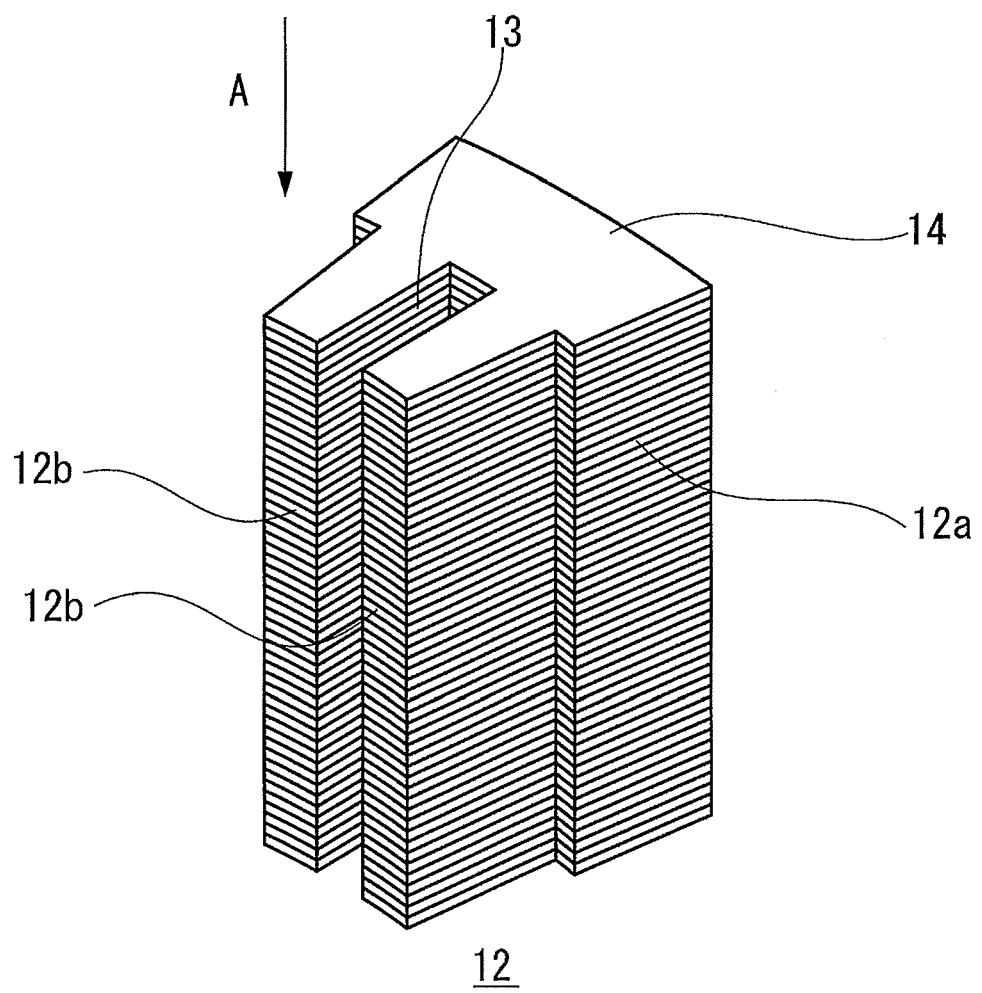
FIG. 4 is a schematic perspective view of a core block composing an armature core of the armature according to embodiment 1 of the present invention.

FIG. 4 is a schematic perspective view of a core block composing the armature core of the armature according to embodiment 1 of the present invention.

As shown in FIG. 4, the core block 12 has a shape obtained by dividing the annular armature core 11 in the circumferential direction.

The core block 12 is formed by stacking a necessary number of core block pieces 14 stamped in a predetermined shape from electromagnetic steel sheets. The core block 12 has an arc shape as seen from a direction (hereinafter, referred to as a stacking direction), indicated by arrow A, in which the core block pieces 14 are stacked, and includes a back yoke formation portion 12a serving as a back yoke of the armature core 11, and two teeth 12b protruding inward in the radial direction from the inner circumferential surface of the back yoke formation portion 12a.

A plurality of core blocks 12 are annularly arranged with their circumferential-direction side surfaces abutting each other, to form the armature core 11.

Slots 13 are formed between the two teeth 12b and between the teeth 12b of the core blocks 12 adjacent to each other in the circumferential direction.

Each tooth 12b is tapered such that the width thereof in the circumferential direction is gradually narrowed inward in the radial direction. Each slot 13 has a rectangular shape as seen from the stacking direction indicated by arrow A, and the armature coils 20 are arranged in the slots 13.

In the present embodiment, the case where the armature core 11 has forty-eight teeth 12b is shown as an example.

The armature coils 20 are formed of coil group units each of which is formed of a plurality of single coils and which are arranged so as to be shifted from each other by one slot in the circumferential direction.

In the present embodiment, each coil group unit is formed of three types of single coils.

Figure 5:
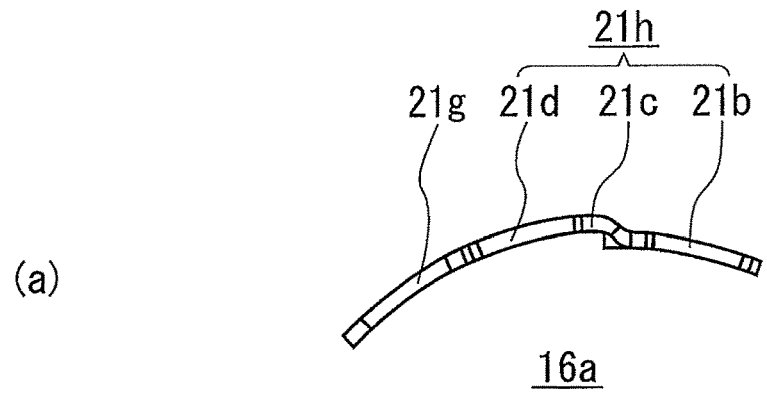
FIG. 5 is a schematic top view (a) and a schematic front view (b) showing the structure of a first single coil forming a coil group unit according to embodiment 1 of the present invention.
Figure 5:
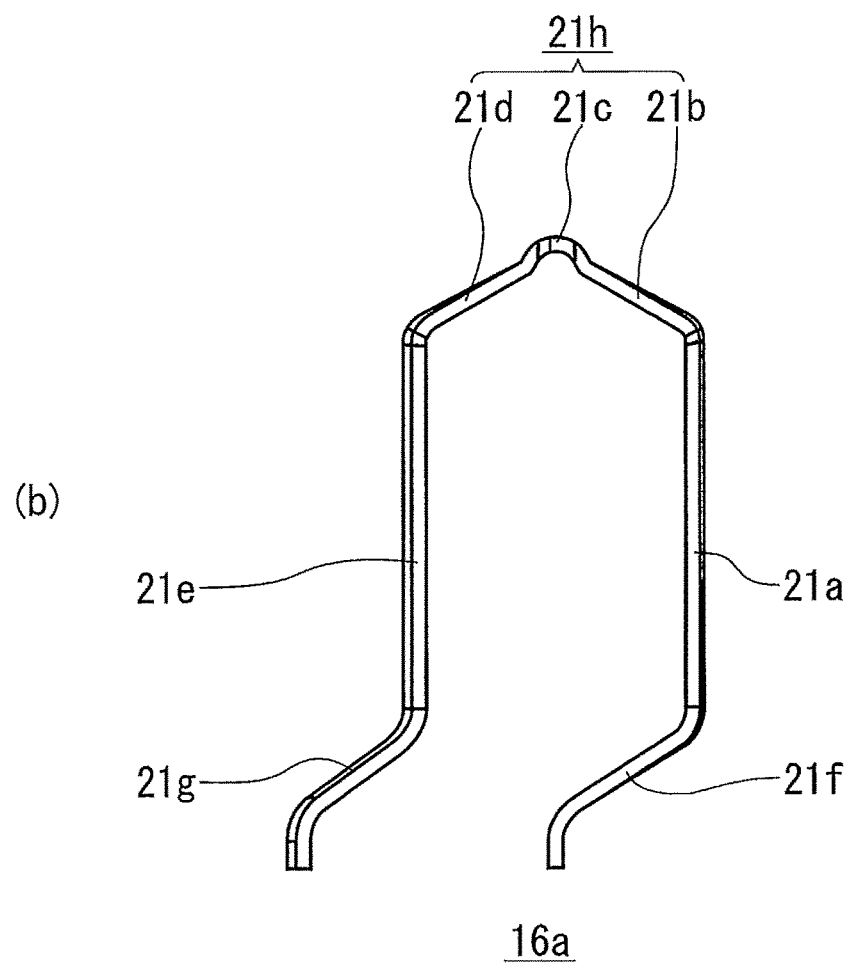

FIG. 5 is a schematic top view (a) and a schematic front view (b) showing the structure of a first single coil forming the coil group unit according to embodiment 1 of the present invention.

As shown in FIG. 5, the first single coil 16a has a first one-side slot accommodation portion 21a to be arranged in one slot 13, and a first other-side slot accommodation portion 21e to be arranged in another slot (hereinafter, referred to as another slot) 13 positioned counterclockwise in the circumferential direction from the one slot 13 with, for example, six teeth therebetween.

That is, there are five slots between the slot 13 in which the first one-side slot accommodation portion 21a is arranged and the slot 13 in which the first other-side slot accommodation portion 21e is arranged.

One end side of the first one-side slot accommodation portion 21a and one end side of the first other-side slot accommodation portion 21e are connected by a first connection portion 21h as a coil end.

The first connection portion 21h is formed by: a first one-side extending portion 21b extending at a predetermined inclination from the first one-side slot accommodation portion 21a toward the first other-side slot accommodation portion 21e side; a first other-side extending portion 21d extending at a predetermined inclination from the first other-side slot accommodation portion 21e toward the first one-side slot accommodation portion 21a side; and a first shift portion 21c via which the first other-side extending portion 21d is shifted outward in the radial direction by one layer from the first one-side extending portion 21b. Thus, at the coil end part, the adjacent coils can be avoided each other.

That is, the first other-side slot accommodation portion 21e is shifted outward in the radial direction by one layer from the first one-side slot accommodation portion 21a.

The one layer corresponds to the thickness of one conductive wire forming the single coil.

A first one-side terminal portion 21f extends from the other end side of the first one-side slot accommodation portion 21a toward the first other-side slot accommodation portion 21e in the circumferential direction, and a first other-side terminal portion 21g extends from the other end side of the first other-side slot accommodation portion 21e toward the same direction as the direction to which the first one-side terminal portion 21f extends, in the circumferential direction.

Figure 6:
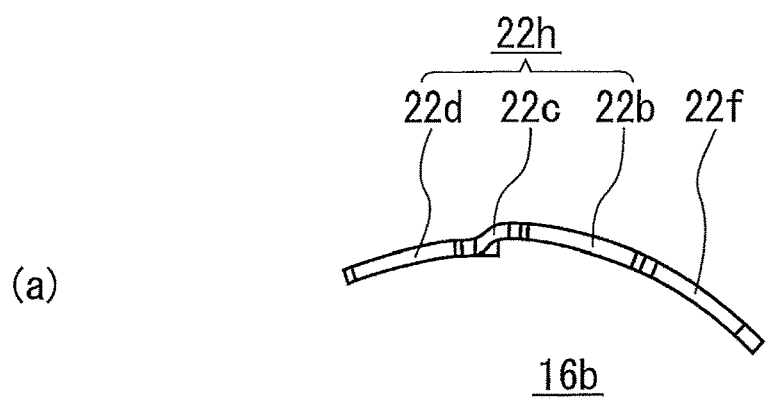
FIG. 6 is a schematic top view (a) and a schematic front view (b) showing the structure of a second single coil forming the coil group unit according to embodiment 1 of the present invention.
Figure 6:
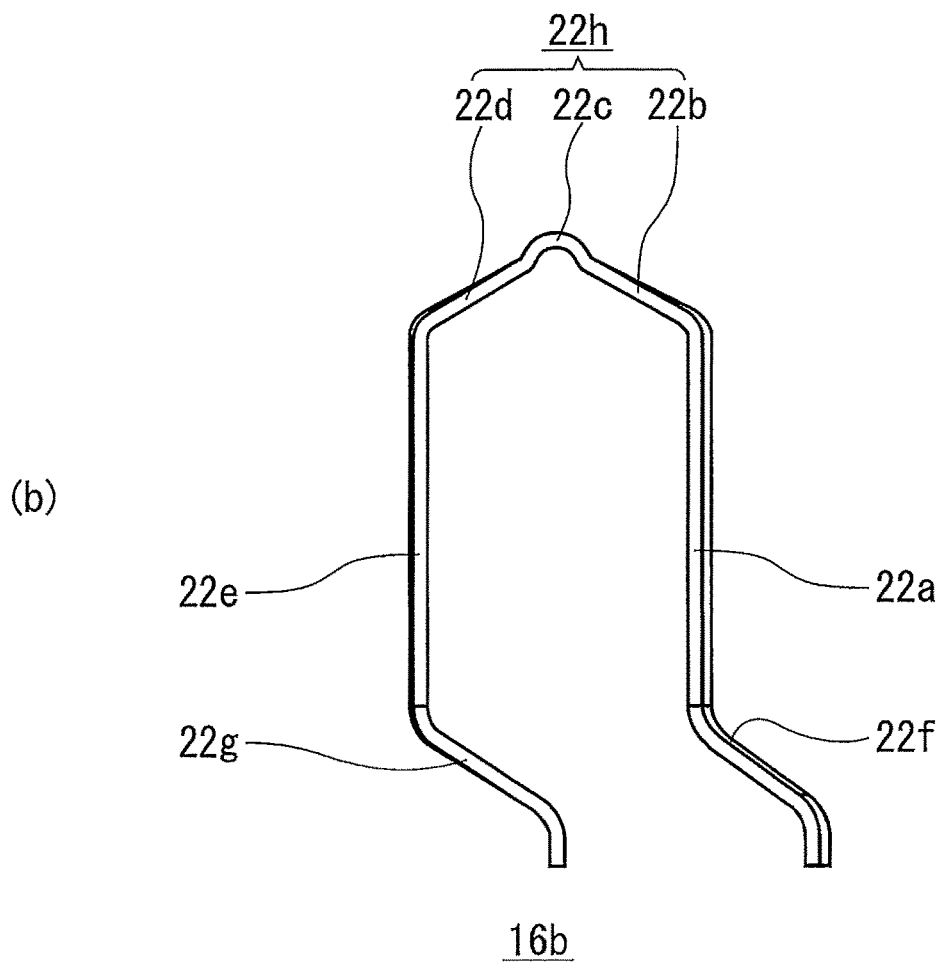

FIG. 6 is a schematic top view (a) and a schematic front view (b) showing the structure of a second single coil forming the coil group unit according to embodiment 1 of the present invention.

As shown in FIG. 6, the second single coil 16b has a second one-side slot accommodation portion 22a to be arranged in one slot 13, and a second other-side slot accommodation portion 22e to be arranged in another slot 13.

One end side of the second one-side slot accommodation portion 22a and one end side of the second other-side slot accommodation portion 22e are connected by a second connection portion 22h as a coil end.

The second connection portion 22h is formed by: a second one-side extending portion 22b extending at a predetermined inclination from the second one-side slot accommodation portion 22a toward the second other-side slot accommodation portion 22e side; a second other-side extending portion 22d extending at a predetermined inclination from the second other-side slot accommodation portion 22e toward the second one-side slot accommodation portion 22a side; and a second shift portion 22c via which the second one-side extending portion 22b is shifted outward in the radial direction by one layer from the second other-side extending portion 22d. Thus, at the coil end part, the adjacent coils can be avoided each other.

That is, the second one-side slot accommodation portion 22a is shifted outward in the radial direction by one layer from the second other-side slot accommodation portion 22e.

The one layer corresponds to the thickness of one conductive wire forming the single coil.

A second other-side terminal portion 22g extends from the other end side of the second other-side slot accommodation portion 22e toward the second one-side slot accommodation portion 22a in the circumferential direction, and a second one-side terminal portion 22f extends from the other end side of the second one-side slot accommodation portion 22a toward the same direction as the direction to which the second other-side terminal portion 22g extends, in the circumferential direction.

Figure 7:
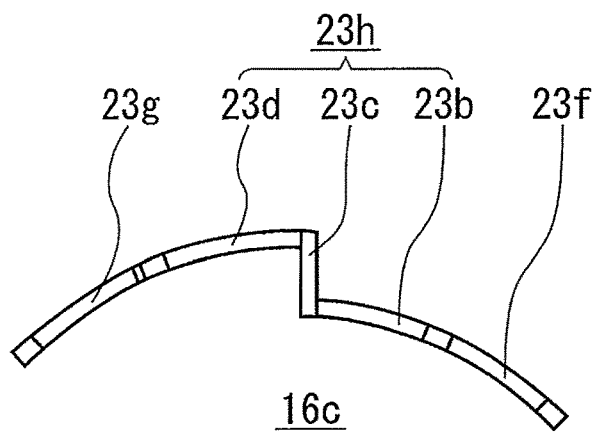
FIG. 7 is a schematic top view (a) and a schematic front view (b) showing the structure of a third single coil forming the coil group unit according to embodiment 1 of the present invention.
Figure 7:
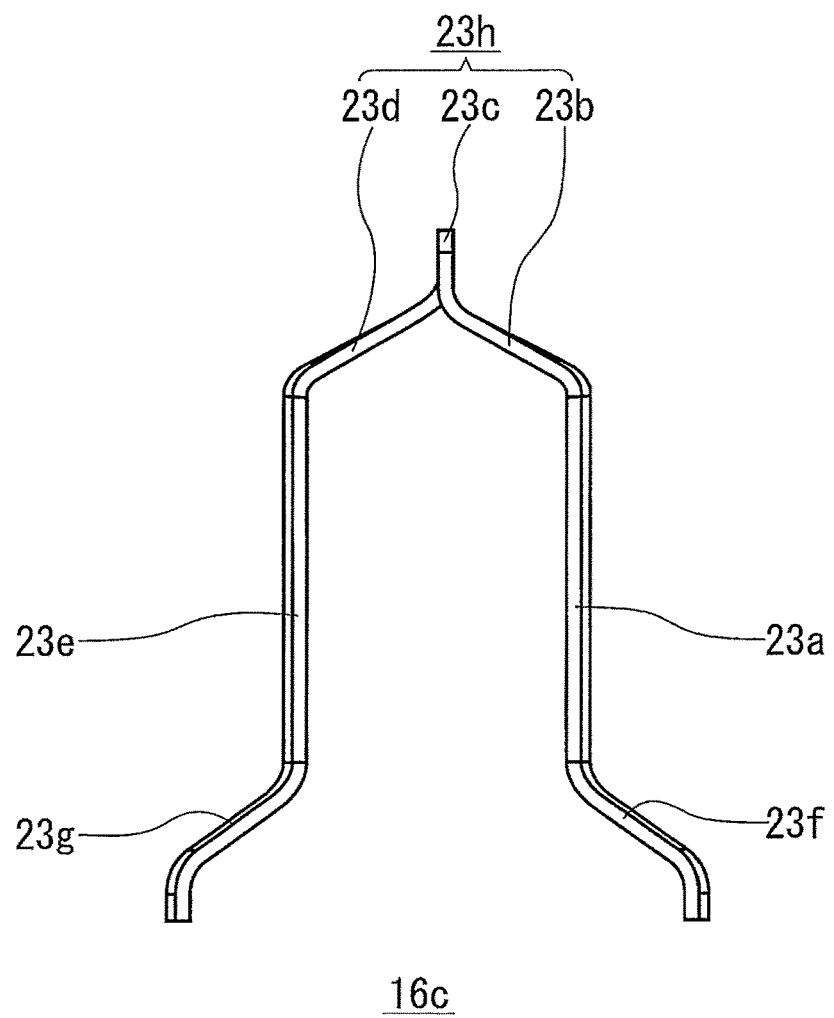

FIG. 7 is a schematic top view (a) and a schematic front view (b) showing the structure of a third single coil forming the coil group unit according to embodiment 1 of the present invention.

As shown in FIG. 7, the third single coil 16c has a third one-side slot accommodation portion 23a to be arranged in one slot 13, and a third other-side slot accommodation portion 23e to be arranged in another slot 13.

One end side of the third one-side slot accommodation portion 23a and one end side of the third other-side slot accommodation portion 23e are connected by a third connection portion 23h as a coil end.

The third connection portion 23h is formed by: a third one-side extending portion 23b extending at a predetermined inclination from the third one-side slot accommodation portion 23a toward the third other-side slot accommodation portion 23e side; a third other-side extending portion 23d extending at a predetermined inclination from the third other-side slot accommodation portion 23e toward the third one-side slot accommodation portion 23a side; and a third shift portion 23c via which the third other-side extending portion 23d is shifted outward in the radial direction by five layers from the third one-side extending portion 23b.

That is, the third other-side slot accommodation portion 23e is shifted outward in the radial direction by five layers from the third one-side slot accommodation portion 23a.

The five layers correspond to the thickness of five conductive wires forming the single coil.

A third one-side terminal portion 23f extends from the other end side of the third one-side slot accommodation portion 23a toward a direction opposite to the third other-side slot accommodation portion 23e in the circumferential direction, and a third other-side terminal portion 23g extends from the other end side of the third other-side slot accommodation portion 23e toward a direction opposite to the third one-side slot accommodation portion 23a in the circumferential direction.

The third one-side terminal portion 23f of the third single coil 16c is connected to the first one-side terminal portion 21f of the first single coil 16a by welding or the like.

The first other-side terminal portion 21g of the first single coil 16a is connected to the second other-side terminal portion 22g of the second single coil 16b by welding or the like.

The second one-side terminal portion 22f of the second single coil 16b is connected to the third other-side terminal portion 23g of the third single coil 16c by welding or the like.

In the present embodiment, the third one-side slot accommodation portion 23a of the third single coil 16c becomes the first layer on the radially innermost side in the slot 13, and the third other-side slot accommodation portion 23e of the third single coil 16c becomes the sixth layer on the radially outermost side in the slot 13.

The first one-side slot accommodation portion 21a of the first single coil 16a becomes the second layer in the slot 13, and the first other-side slot accommodation portion 21e of the first single coil 16a becomes the third layer in the slot 13.

The second other-side slot accommodation portion 22e of the second single coil 16b becomes the fourth layer in the slot 13, and the second one-side slot accommodation portion 22a of the second single coil 16b becomes the fifth layer in the slot 13.

Figure 8:
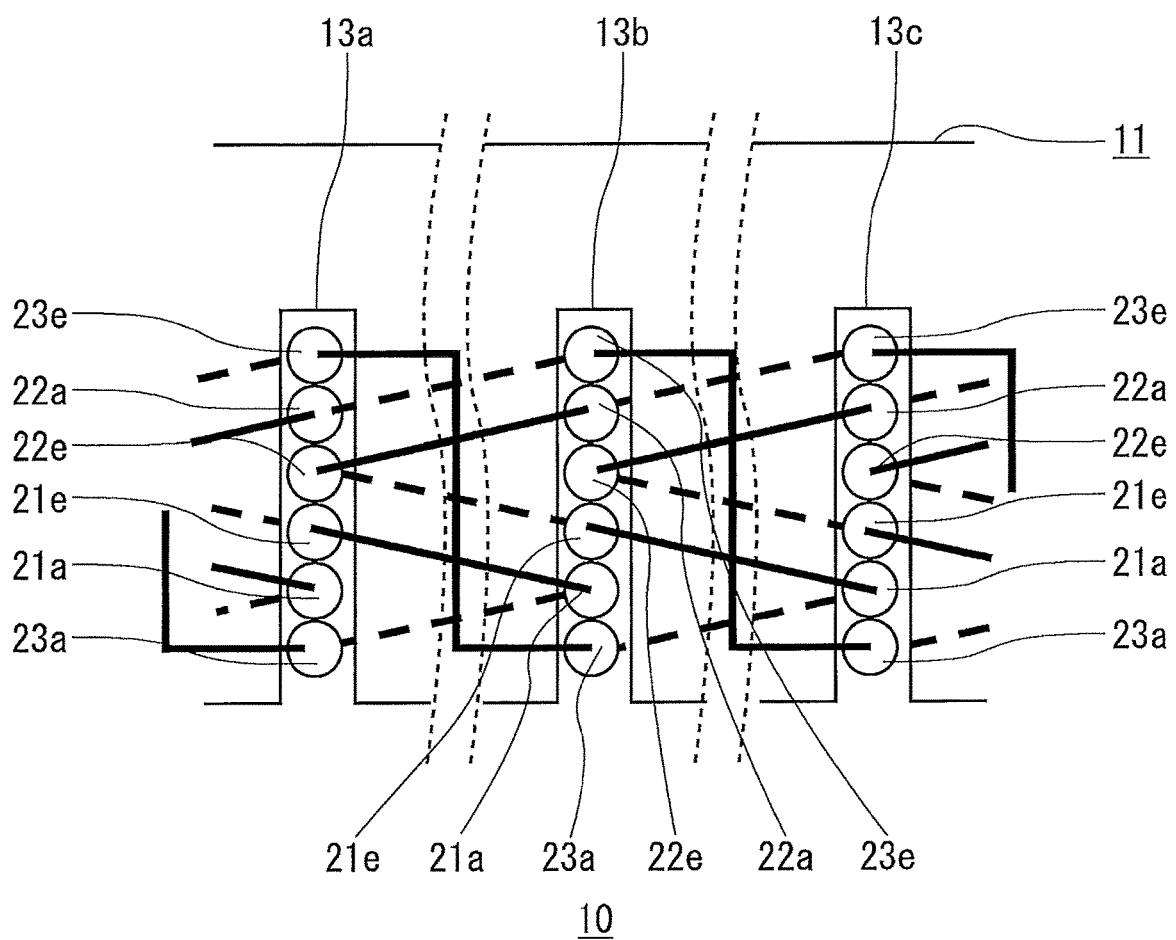
FIG. 8 is a schematic top view illustrating the state in which slot accommodation portions of a plurality of coil group units are arranged in slots, in armature coils according to embodiment 1 of the present invention.

FIG. 8 is a schematic top view illustrating the state in which the slot accommodation portions of a plurality of the coil group units are arranged in the slots, in the armature coils according to embodiment 1 of the present invention.

In FIG. 8, for convenience of description, the teeth 12b and the slots 13 annularly arranged in the armature core 11 are shown in a developed manner in a straight line.

In FIG. 8, for convenience of description, the slots are referred to as a first slot 13a, a second slot 13b, and then a third slot 13c, from the left in the drawing. There are five slots in the circumferential direction in each of the interval between the first slot 13a and the second slot 13b and the interval between the second slot 13b and the third slot 13c.

The slots present between the first slot 13a and the second slot 13b and the slots present between the second slot 13b and the third slot 13c are not shown.

As shown in FIG. 8, in each slot 13a, 13b, 13c, the third one-side slot accommodation portion 23a of the third single coil 16c is located as the first layer, and the third other-side slot accommodation portion 23e of the third single coil 16c is located as the sixth layer.

In addition, the first one-side slot accommodation portion 21a of the first single coil 16a is located as the second layer, and the first other-side slot accommodation portion 21e of the first single coil 16a is located as the third layer.

In addition, the second other-side slot accommodation portion 22e of the second single coil 16b is located as the fourth layer, and the second one-side slot accommodation portion 22a of the second single coil 16b is located as the fifth layer.

The slot accommodation portions of the single coils arranged in the slots 13a, 13b, 13c are connected via the connection portions and the terminal portions.

With reference to FIG. 8, the state of connection among the slot accommodation portions via the connection portions and the terminal portions will be described.

The state of connection among the slot accommodation portions via the connection portions and the terminal portions will be described focusing on the slot accommodation portions arranged in the second slot 13b.

As shown in FIG. 8, the third one-side slot accommodation portion 23a in the first layer of the second slot 13b is connected to the third other-side slot accommodation portion 23e in the sixth layer of the first slot 13a via the third connection portion 23h. In addition, the third one-side slot accommodation portion 23a in the first layer of the second slot 13b is connected to the first one-side slot accommodation portion 21a in the second layer of the third slot 13c via the third one-side terminal portion 23f and the first one-side terminal portion 21f.

The first one-side slot accommodation portion 21a in the second layer of the second slot 13b is connected to the first other-side slot accommodation portion 21e in the third layer of the first slot 13a via the first connection portion 21h. In addition, the first one-side slot accommodation portion 21a in the second layer of the second slot 13b is connected to the third one-side slot accommodation portion 23a in the first layer of the first slot 13a via the first one-side terminal portion 21f and the third one-side terminal portion 23f.

The first other-side slot accommodation portion 21e in the third layer of the second slot 13b is connected to the first one-side slot accommodation portion 21a in the second layer of the third slot 13c via the first connection portion 21h. In addition, the first other-side slot accommodation portion 21e in the third layer of the second slot 13b is connected to the second other-side slot accommodation portion 22e in the fourth layer of the first slot 13a via the first other-side terminal portion 21g and the second other-side terminal portion 22g.

The second other-side slot accommodation portion 22e in the fourth layer of the second slot 13b is connected to the second one-side slot accommodation portion 22a in the fifth layer of the third slot 13c via the second connection portion 22h. In addition, the second other-side slot accommodation portion 22e in the fourth layer of the second slot 13b is connected to the first other-side slot accommodation portion 21e in the third layer of the third slot 13c via the second other-side terminal portion 22g and the first other-side terminal portion 21g.

The second one-side slot accommodation portion 22a in the fifth layer of the second slot 13b is connected to the second other-side slot accommodation portion 22e in the fourth layer of the first slot 13a via the second connection portion 22h. In addition, the second one-side slot accommodation portion 22a in the fifth layer of the second slot 13b is connected to the third other-side slot accommodation portion 23e in the sixth layer of the third slot 13c via the second one-side terminal portion 22f and the third other-side terminal portion 23g.

The third other-side slot accommodation portion 23e in the sixth layer of the second slot 13b is connected to the third one-side slot accommodation portion 23a in the first layer of the third slot 13c via the third connection portion 23h. In addition, the third other-side slot accommodation portion 23e in the sixth layer of the second slot 13b is connected to the second one-side slot accommodation portion 22a in the fifth layer of the first slot 13a via the third other-side terminal portion 23g and the second one-side terminal portion 22f.

In FIG. 8, connection via the connection portions which are the coil ends of the anti-wire-connection side is indicated by a solid line, and connections by the terminal portions which are the coil ends of the wire-connection side are indicated by broken lines.

Next, on the basis of the arrangement state of the coil accommodation portions of the single coils in the slots and the connection state of the connection portions of the coil accommodation portions shown in FIG. 8, the structure of coil ends of the anti-wire-connection side which is a side on which the connection portions of the single coils are present will be described.

Figure 9:
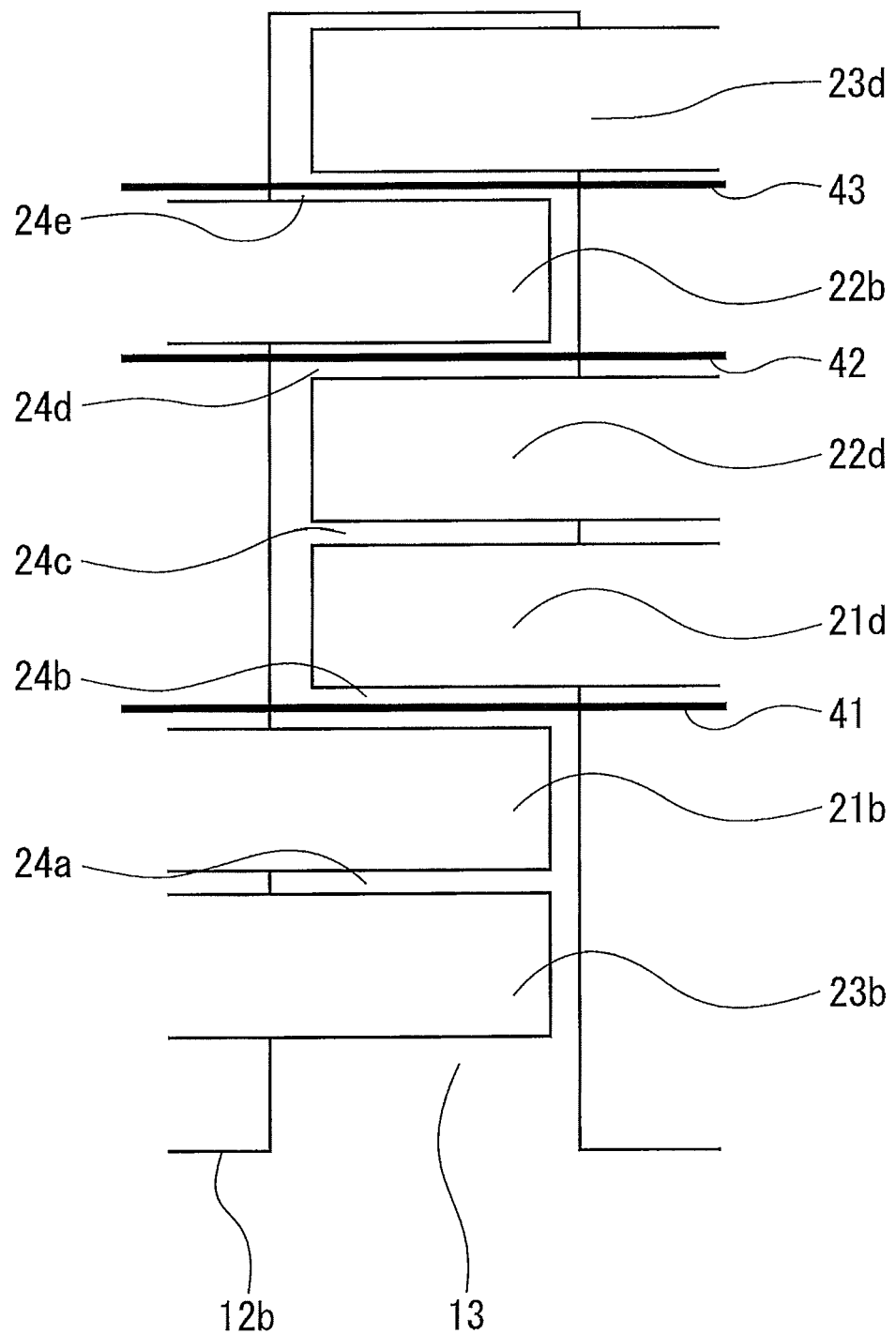
FIG. 9 is a schematic front view showing coil ends of the anti-wire-connection side in the armature according to embodiment 1 of the present invention.

FIG. 9 is a schematic front view showing coil ends of the anti-wire-connection side in the armature according to embodiment 1 of the present invention.

As shown in FIG. 9, the third single coil 16c having the third one-side slot accommodation portion 23a as the first layer, and the first single coil 16a having the first one-side slot accommodation portion 21a as the second layer, have the connection portions extending in the same direction and have the same phase. Therefore, voltage between the third one-side extending portion 23b which is a coil end of the third single coil 16c, and the first one-side extending portion 21b which is a coil end of the first single coil 16a, is the same as voltage between their respective slot accommodation portions in the first layer and the second layer adjacent to each other in the slot. Therefore, no insulation sheet is provided in a coil end interval 24a between the third one-side extending portion 23b and the first one-side extending portion 21b.

The first single coil 16a having the first one-side slot accommodation portion 21a as the second layer, and another first single coil 16a having the first other-side slot accommodation portion 21e as the third layer, have the connection portions extending in directions opposite to each other and have phases different from each other. Therefore, voltage between the first one-side extending portion 21b which is a coil end of the first single coil 16a, and the first other-side extending portion 21d which is a coil end of the other first single coil 16a, is greater than voltage between their respective slot accommodation portions in the second layer and the third layer adjacent to each other in the slot. Therefore, an insulation sheet 41 is provided in a coil end interval 24b between the first one-side extending portion 21b and the first other-side extending portion 21d of the other first single coil 16a.

The first single coil 16a having the first other-side slot accommodation portion 21e as the third layer, and the second single coil 16b having the second other-side slot accommodation portion 22e as the fourth layer, have the connection portions extending in the same direction and have the same phase. Therefore, voltage between the first other-side extending portion 21d which is a coil end of the first single coil 16a, and the second other-side extending portion 22d which is a coil end of the second single coil 16b is the same as voltage between their respective slot accommodation portions in the third layer and the fourth layer adjacent to each other in the slot. Therefore, no insulation sheet is provided in a coil end interval 24c between the first other-side extending portion 21d and the second other-side extending portion 22d.

The second single coil 16b having the second other-side slot accommodation portion 22e as the fourth layer, and another second single coil 16b having the second one-side slot accommodation portion 22a as the fifth layer, have the connection portions extending in directions opposite to each other and have phases different from each other. Therefore, voltage between the second other-side extending portion 22d which is a coil end of the second single coil 16b, and the second one-side extending portion 22b which is a coil end of the other second single coil 16b, is greater than voltage between their respective slot accommodation portions in the fourth layer and the fifth layer adjacent to each other in the slot. Therefore, an insulation sheet 42 is provided in a coil end interval 24d between the second other-side extending portion 22d and the second one-side extending portion 22b.

The second single coil 16b having the second one-side slot accommodation portion 22a as the fifth layer, and the third single coil 16c having the third other-side slot accommodation portion 23e as the sixth layer, have the connection portions extending in directions opposite to each other and have phases different from each other. Therefore, voltage between the second one-side extending portion 22b which is a coil end of the second single coil 16b, and the third other-side extending portion 23d which is a coil end of the third single coil 16c, is greater than voltage between their respective slot accommodation portions in the fifth layer and the sixth layer adjacent to each other in the slot. Therefore, an insulation sheet 43 is provided in a coil end interval 24e between the second one-side extending portion 22b and the third other-side extending portion 23d.

Next, on the basis of the arrangement state of the coil accommodation portions of the single coils in the slots and the connection state of the terminal portions of the coil accommodation portions shown in FIG. 8, the structure of coil ends on the wire-connection side which is a side on which the terminal portions of the single coils are present will be described.

Figure 10:
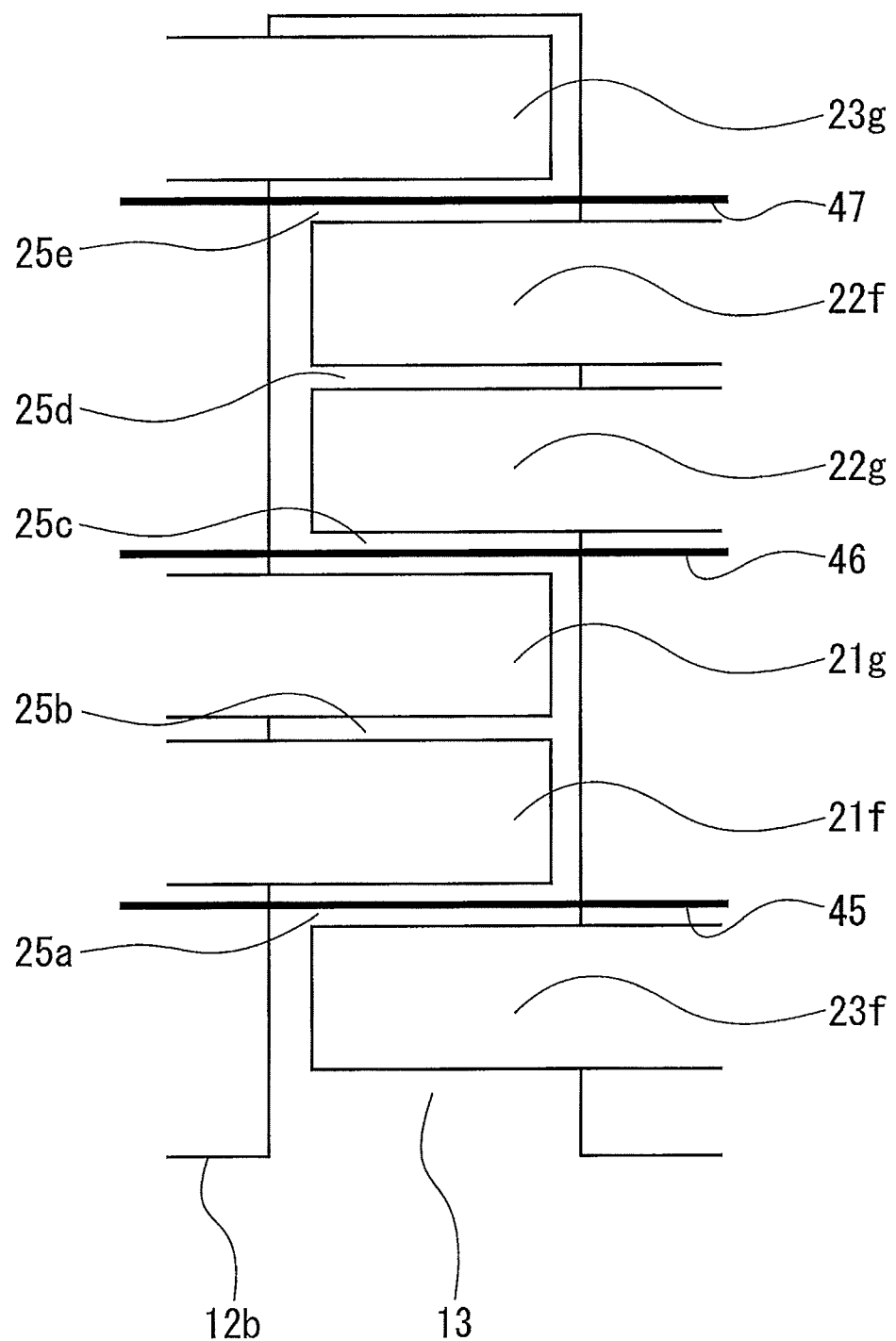
FIG. 10 is a schematic front view showing coil ends of the wire-connection side in the armature according to embodiment 1 of the present invention.

FIG. 10 is a schematic front view showing coil ends of the wire-connection side in the armature according to embodiment 1 of the present invention.

The third one-side terminal portion 23f protruding clockwise in the circumferential direction in an inclined manner from the third one-side slot accommodation portion 23a of the third single coil 16c, located as the first layer is electrically connected, by welding or the like, to the first one-side terminal portion 21f protruding counterclockwise in the circumferential direction in an inclined manner from the first one-side slot accommodation portion 21a of the first single coil 16a, located as the second layer in another slot.

That is, in the same slot, the third single coil 16c having the third one-side slot accommodation portion 23a as the first layer, and the first single coil 16a having the first one-side slot accommodation portion 21a as the second layer, have the terminal portions extending in directions opposite to each other and have phases different from each other. Therefore, an insulation sheet 45 is provided in a coil end interval 25a between the third one-side terminal portion 23f and the first one-side terminal portion 21f.

The first one-side terminal portion 21f protruding in the circumferential direction in an inclined manner from the first one-side slot accommodation portion 21a of the first single coil 16a, located as the second layer, and the first other-side terminal portion 21g protruding in the circumferential direction in an inclined manner from the first other-side slot accommodation portion 21e of the first single coil 16a, located as the third layer in the same slot, extend in the same direction from the same slot, and the first single coil 16a located as the second layer and the first single coil 16a located as the third layer have the same phase. Therefore, no insulation sheet is provided in a coil end interval 25b between the first one-side terminal portion 21f and the first other-side terminal portion 21g.

The first other-side terminal portion 21g protruding counterclockwise in the circumferential direction in an inclined manner from the first other-side slot accommodation portion 21e of the first single coil 16a, located as the third layer is electrically connected, by welding or the like, to the second other-side terminal portion 22g protruding clockwise in the circumferential direction in an inclined manner from the second other-side slot accommodation portion 22e of the second single coil 16b, located as the fourth layer in another slot.

That is, in the same slot, the first single coil 16a having the first other-side slot accommodation portion 21e as the third layer, and the second single coil 16b having the second other-side slot accommodation portion 22e as the fourth layer, have the terminal portions extending in directions opposite to each other and have phases different from each other. Therefore, an insulation sheet 46 is provided in a coil end interval 25c between the first other-side terminal portion 21g and the second other-side terminal portion 22g.

The second other-side terminal portion 22g protruding in the circumferential direction in an inclined manner from the second other-side slot accommodation portion 22e of the second single coil 16b, located as the fourth layer, and the second one-side terminal portion 22f protruding in the circumferential direction in an inclined manner from the second one-side slot accommodation portion 22a of the second single coil 16b, located as the fifth layer, extend in the same direction from the same slot, and the second single coil 16b located as the fourth layer and the second single coil 16b located as the fifth layer have the same phase. Therefore, no insulation sheet is provided in a coil end interval 25d between the second other-side terminal portion 22g and the second one-side terminal portion 22f.

The second one-side terminal portion 22f protruding clockwise in the circumferential direction in an inclined manner from the second one-side slot accommodation portion 22a of the second single coil 16b, located as the fifth layer is electrically connected, by welding or the like, to the third other-side terminal portion 23g protruding counterclockwise in the circumferential direction in an inclined manner from the third other-side slot accommodation portion 23e of the third single coil 16c, located as the sixth layer in another slot.

That is, in the same slot, the second single coil 16b having the second one-side slot accommodation portion 22a as the fifth layer, and the third single coil 16c having the third other-side slot accommodation portion 23e as the sixth layer, have the terminal portions extending in directions opposite to each other and have phases different from each other. Therefore, an insulation sheet 47 is provided in a coil end interval 25e between the second one-side terminal portion 22f and the third other-side terminal portion 23g.

Figure 11:
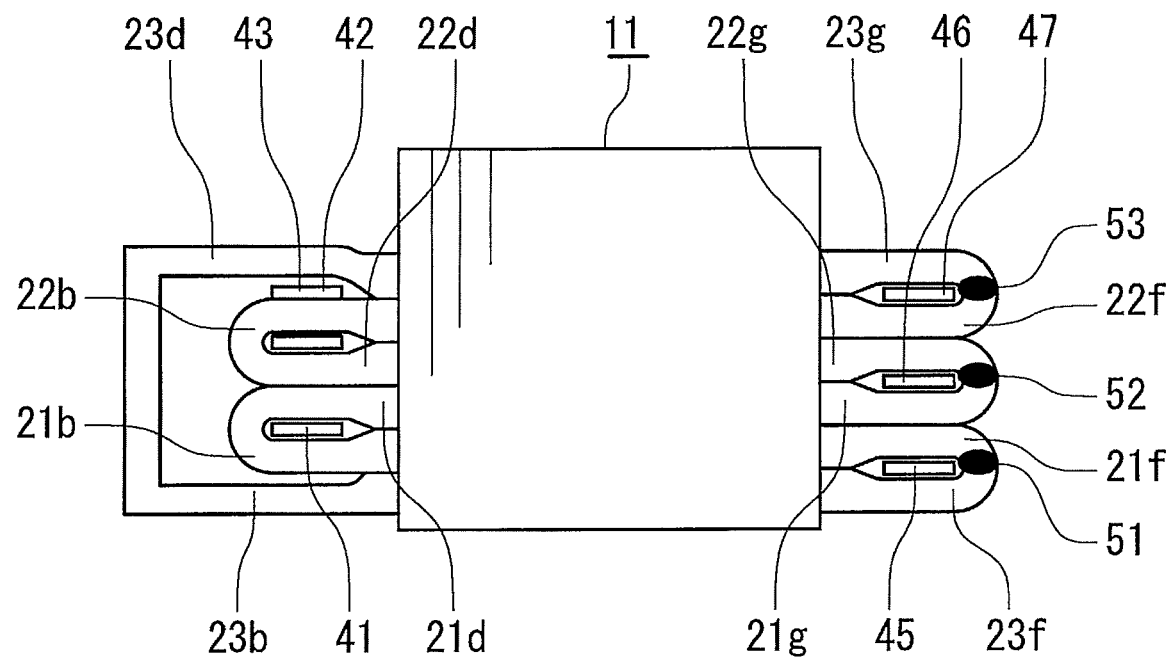
FIG. 11 is a schematic side view showing the state of coils arranged in the slots of the armature core in the rotating electric machine according to embodiment 1 of the present invention.

FIG. 11 is a schematic side view showing the state of coils arranged in the slots of the armature core in the rotating electric machine according to embodiment 1 of the present invention.

As shown in FIG. 11, in the axial direction of the armature core 11, the coil ends of the anti-wire-connection side protrude from one end side and the coil ends of the wire-connection side protrude from the other end side.

At the coil ends of the anti-wire-connection side, the insulation sheets 41, 42, 43 are respectively provided between the first one-side extending portion 21b and the first other-side extending portion 21d, between the second other-side extending portion 22d and the second one-side extending portion 22b, and between the second one-side extending portion 22b and the third other-side extending portion 23d.

At the coil ends on the wire-connection side, the insulation sheets 45, 46, 47 are respectively provided between the third one-side terminal portion 23f and the first one-side terminal portion 21f, between the first other-side terminal portion 21g and the second other-side terminal portion 22g, and between the second one-side terminal portion 22f and the third other-side terminal portion 23g.

The third one-side terminal portion 23f and the first one-side terminal portion 21f are connected via a welded portion 51. The first other-side terminal portion 21g and the second other-side terminal portion 22g are connected via a welded portion 52. The second one-side terminal portion 22f and the third other-side terminal portion 23g are connected via a welded portion 53.

In the rotating electric machine of the present embodiment, among the coil ends, parts required to have high dielectric strength are insulated by insulation sheets, whereby the reliability is improved.

In the armature, the amount of insulation sheets used at the coil ends of the anti-wire-connection side and the coil ends of the wire-connection side can be decreased. Therefore, the cost can be reduced, and the process steps for providing the insulation sheets can be decreased, whereby the productivity can be improved.

The number of locations among layers, in which the insulation sheets are provided at the coil ends, is decreased. Therefore, the size of the armature can be reduced, and even if insulation sheets with a large thickness are used in response to high voltage due to high output, increase in the size of the armature can be avoided.

That is, a small-sized and high-output rotating electric machine can be obtained.

In the present embodiment, insulation sheets are used as the insulators provided in coil end intervals, but insulation films may be used.

In the present embodiment, the number of layers formed by the slot accommodation portions of the single coils arranged in the slot 13 is six, but, for example, ten layers may be formed.

Figure 12:
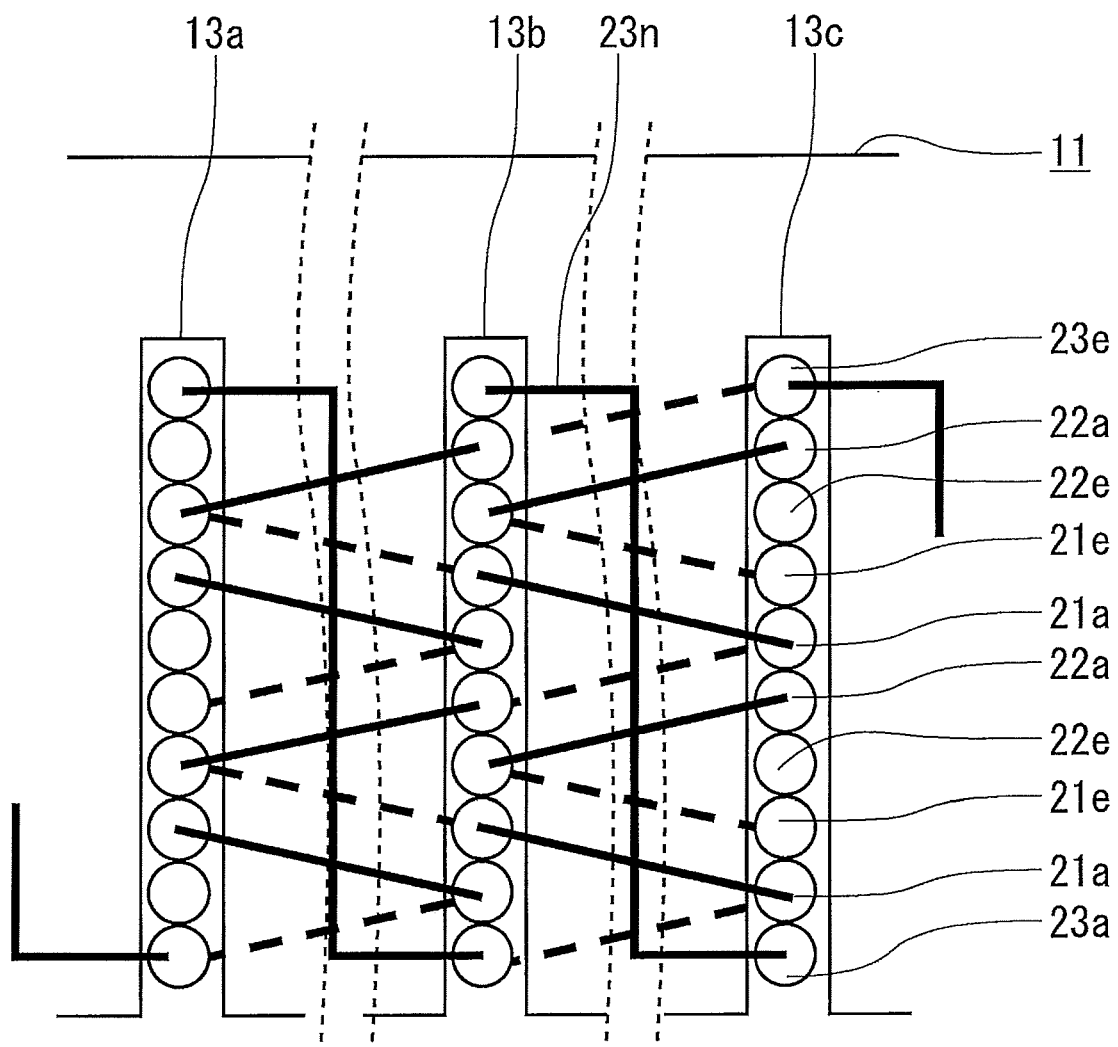
FIG. 12 is a schematic top view illustrating the state in which ten layers of slot accommodation portions are arranged in each slot in the armature coil according to embodiment 1 of the present invention.

FIG. 12 is a schematic top view illustrating the state in which ten layers of slot accommodation portions are arranged in each slot in the armature coil according to embodiment 1 of the present invention.

Also in FIG. 12, connection via the connection portions which are the coil ends of the anti-wire-connection side is indicated by a solid line, and connection via the terminal portions which are the coil ends of the wire-connection side is indicated by a broken line.

As shown in FIG. 12, the configuration from the first layer to the fifth layer is the same as in the case of six layers shown in FIG. 8.

However, the second one-side slot accommodation portion 22a forming the fifth layer is connected via the terminal portions to the first one-side slot accommodation portion 21a, of the first single coil 16a, which forms the sixth layer. The first one-side slot accommodation portion 21a forming the sixth layer is connected via the connection portions to the first other-side slot accommodation portion 21e forming the seventh layer. The first other-side slot accommodation portion 21e forming the seventh layer is connected via the terminal portions to the second other-side slot accommodation portion 22e, of the second single coil 16b, which forms the eighth layer. The second other-side slot accommodation portion 22e forming the eighth layer is connected via the connection portions to the second one-side slot accommodation portion 22a forming the ninth layer. The second one-side slot accommodation portion 22a forming the ninth layer is connected via the terminal portions to the third other-side slot accommodation portion 23e, of the third single coil, which forms the tenth layer.

The configuration from the sixth layer to the ninth layer formed by the first single coil 16a and the second single coil 16b is the same as the configuration from the second layer to the fifth layer formed by the first single coil 16a and the second single coil 16b.

That is, the configurations of the coil ends of the anti-wire-connection side and the wire-connection side extending in the circumferential direction from the slot accommodation portions of the sixth to ninth layers are the same as the configurations of the coil ends of the anti-wire-connection side and the wire-connection side extending in the circumferential direction from the slot accommodation portions of the second to fifth layers. In the sixth to ninth layers, insulation sheets are provided between the coil ends extending in directions opposite to each other from the slot accommodation portions.

In the third single coil, the third one-side slot accommodation portion 23a forming the first layer is connected to the third other-side slot accommodation portion 23e forming the tenth layer, via the third connection portion 23h having a shift portion for shifting upward in the radial direction by nine layers.

The armature coil of the present embodiment may have, between the coil accommodation portion in the first layer and the coil accommodation portion in the outermost layer in the radial direction, one or more of the structure in which four layers of slot accommodation portions of the first single coils and the second single coils are stacked from the lowermost layer in the order of the first one-side slot accommodation portion 21a, the first other-side slot accommodation portion 21e, the second other-side slot accommodation portion 22e, and then the second one-side slot accommodation portion 22a.

In the present embodiment, a slot in which the one-side slot accommodation portion of each single coil is arranged, and a slot in which the other-side slot accommodation portion of the single coil is arranged, are separated from each other with five slots interposed therebetween in the circumferential direction, but the number of the slots is not limited to five.

In the armature of the present embodiment, as shown in FIG. 8, in the case where the armature coil is configured by six layers of slot accommodation portions corresponding to (4n+2) layers (n is a natural number) at n=1, at the coil ends of the anti-wire-connection side, the connection portions extending from the slot accommodation portions in the second layer and the fifth layer which is the (4n+1)th layer extend toward the same direction in the circumferential direction as the connection portion extending from the slot accommodation portion in the first layer.

In addition, the connection portions extending from the slot accommodation portions in the third layer which is the (4n−1)th layer, the fourth layer which is the (4n)th layer, and the (4n+2)th layer which is the outermost layer, extend toward a direction, in the circumferential direction, opposite to the connection portion extending from the slot accommodation portion in the first layer.

As shown in FIG. 12, in the case where the armature coil is configured by ten layers of slot accommodation portions corresponding to (4n+2) layers at n=2, at the coil ends of the anti-wire-connection side, the connection portions extending from the slot accommodation portions in the second layer, the fifth and ninth layers which are the (4n+1)th layers, and the sixth layer which is the (4n+2)th layer other than the outermost layer, extend toward the same direction in the circumferential direction as the connection portion extending from the slot accommodation portion in the first layer.

In addition, the connection portions extending from the third and seventh layers which are the (4n−1)th layers, the fourth and eighth layers which are the (4n)th layers, and the tenth layer which is the outermost (4n+2)th layer, extend toward a direction, in the circumferential direction, opposite to the connection portion extending from the slot accommodation portion in the first layer.

In the armature of the present embodiment, in the armature coil, insulation sheets are provided between connection portions that are adjacent in the radial direction and extend toward directions different from each other in the circumferential direction, and no insulation sheet is provided between connection portions that are adjacent in the radial direction and extend toward the same direction in the circumferential direction.

Embodiment 2

A rotating electric machine in the present embodiment is the same as the rotating electric machine 100 in embodiment 1 except that the armature coil is configured by using a coil group unit composed of: a first single coil 17a (FIG. 23) having terminal portions extending toward a direction, in the circumferential direction, opposite to the terminal portions of the first single coil 16a in embodiment 1; a second single coil 17b (FIG. 24) having terminal portions extending toward a direction, in the circumferential direction, opposite to the terminal portions of the second single coil 16b in embodiment 1; and a third single coil 17c (FIG. 13) having a third shift portion 33c different from the third shift portion 23c in embodiment 1.

Figure 23:
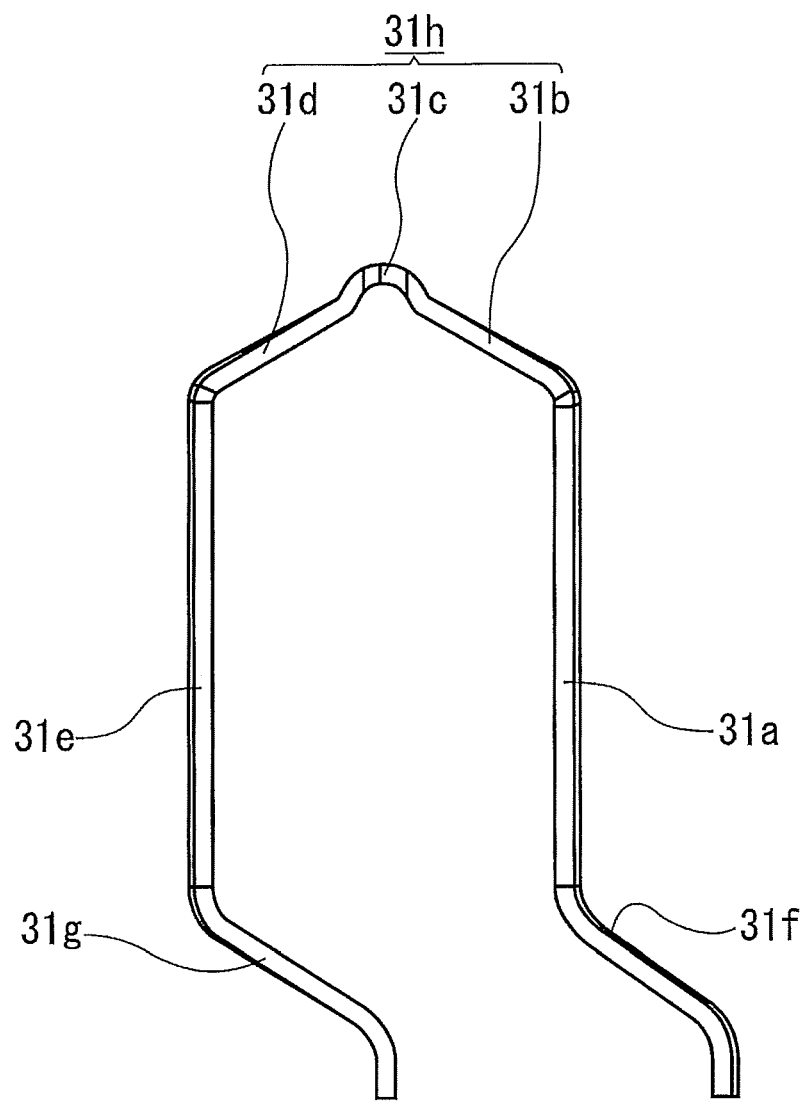
FIG. 23 is a schematic front view showing the structure of a first single coil forming the coil group unit according to embodiment 2 of the present invention.

FIG. 23 is a schematic front view showing the structure of the first single coil forming the coil group unit according to embodiment 2 of the present invention.

As shown in FIG. 23, the first single coil 17a has a first one-side slot accommodation portion 31a to be arranged in one slot 13, and a first other-side slot accommodation portion 31e to be arranged in another slot 13 positioned counterclockwise in the circumferential direction from the one slot 13 with, for example, six teeth interposed therebetween.

That is, there are five slots between the slot 13 in which the first one-side slot accommodation portion 31a is arranged and the slot 13 in which the first other-side slot accommodation portion 31e is arranged.

One end side of the first one-side slot accommodation portion 31a and one end side of the first other-side slot accommodation portion 31e are connected by a first connection portion 31h as a coil end.

The first connection portion 31h is formed by: a first one-side extending portion 31b extending at a predetermined inclination from the first one-side slot accommodation portion 31a toward the first other-side slot accommodation portion 31e side; a first other-side extending portion 31d extending at a predetermined inclination from the first other-side slot accommodation portion 31e toward the first one-side slot accommodation portion 31a side; and a first shift portion 31c via which the first other-side extending portion 31d is shifted outward in the radial direction by one layer from the first one-side extending portion 31b. Thus, at the coil end part, the adjacent coils can be avoided.

That is, the first other-side slot accommodation portion 31e is shifted outward in the radial direction by one layer from the first one-side slot accommodation portion 31a.

The one layer corresponds to the thickness of one conductive wire forming the single coil.

A first other-side terminal portion 31g extends from the other end side of the first other-side slot accommodation portion 31e toward the first one-side slot accommodation portion 31a in the circumferential direction, and a first one-side terminal portion 31f extends from the other end side of the first one-side slot accommodation portion 31a toward the same direction as the direction to which the first other-side terminal portion 31g extends, in the circumferential direction.

Figure 24:
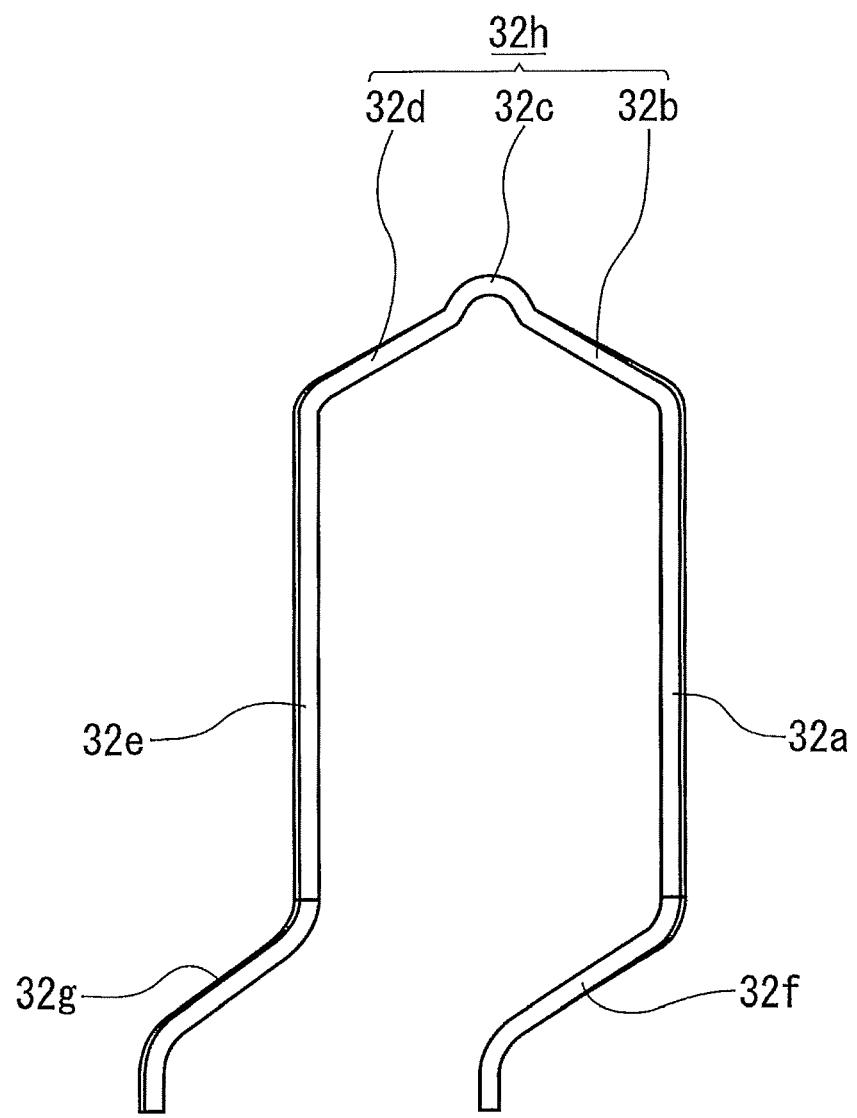
FIG. 24 is a schematic front view showing the structure of a second single coil forming the coil group unit according to embodiment 2 of the present invention.

FIG. 24 is a schematic front view showing the structure of the second single coil forming the coil group unit according to embodiment 2 of the present invention.

As shown in FIG. 24, the second single coil 17b has a second one-side slot accommodation portion 32a to be arranged in one slot 13, and a second other-side slot accommodation portion 32e to be arranged in another slot 13.

One end side of the second one-side slot accommodation portion 32a and one end side of the second other-side slot accommodation portion 32e are connected by a second connection portion 32h as a coil end.

The second connection portion 32h is formed by: a second one-side extending portion 32b extending at a predetermined inclination from the second one-side slot accommodation portion 32a toward the second other-side slot accommodation portion 32e side; a second other-side extending portion 32d extending at a predetermined inclination from the second other-side slot accommodation portion 32e toward the second one-side slot accommodation portion 32a side; and a second shift portion 32c via which the second one-side extending portion 32b is shifted outward in the radial direction by one layer from the second other-side extending portion 32d. Thus, at the coil end part, the adjacent coils can be avoided.

That is, the second one-side slot accommodation portion 32a is shifted outward in the radial direction by one layer from the second other-side slot accommodation portion 32e.

The one layer corresponds to the thickness of one conductive wire forming the single coil.

A second one-side terminal portion 32f extends from the other end side of the second one-side slot accommodation portion 32a toward the second other-side slot accommodation portion 32e in the circumferential direction, and a second other-side terminal portion 32g extends from the other end side of the second other-side slot accommodation portion 32e toward the same direction as the direction to which the second one-side terminal portion 32f extends, in the circumferential direction.

Figure 13:
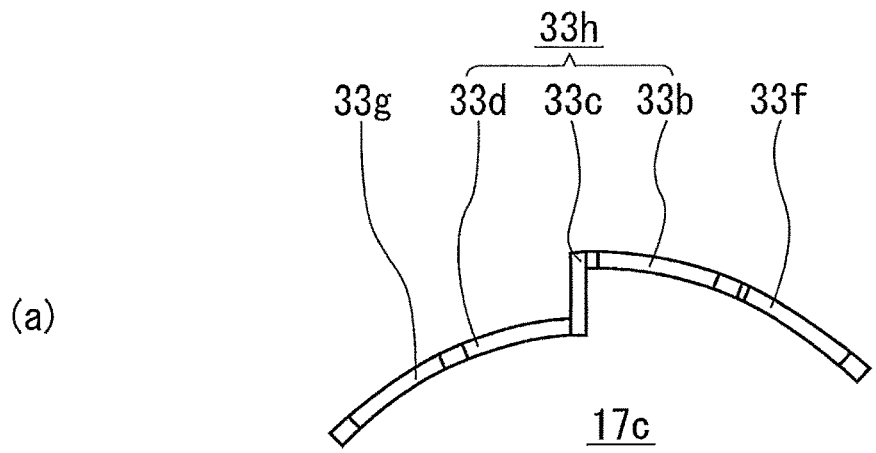
FIG. 13 is a schematic top view (a) and a schematic front view (b) showing the structure of a third single coil forming a coil group unit in a rotating electric machine according to embodiment 2 of the present invention.
Figure 13:
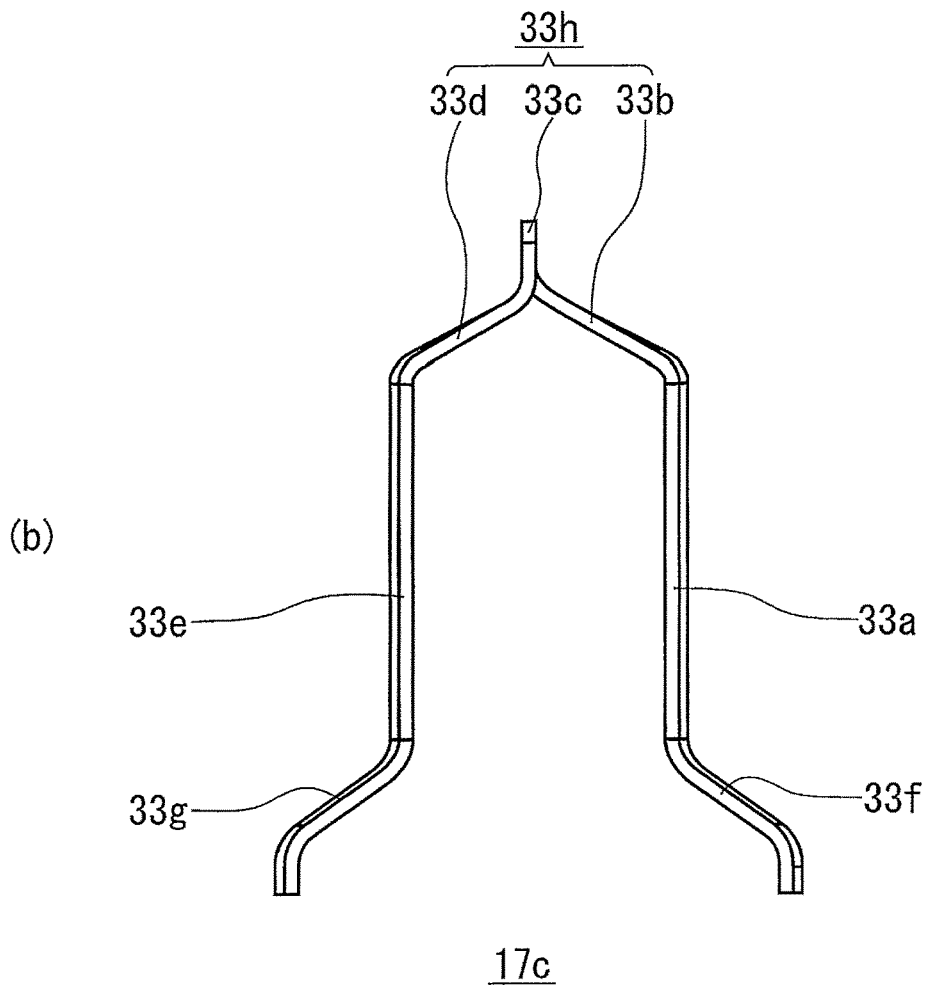

FIG. 13 is a schematic top view (a) and a schematic front view (b) showing the structure of the third single coil forming the coil group unit in the rotating electric machine according to embodiment 2 of the present invention.

As shown in FIG. 13, in the third single coil 17c of the present embodiment, a third one-side slot accommodation portion 33a to be arranged in one slot 13 is shifted outward in the radial direction by five layers from a third other-side slot accommodation portion 33e to be arranged in another slot 13, by a third shift portion 33c of a third connection portion 33h as a coil end.

A third one-side extending portion 33b extends from one end side of the third one-side slot accommodation portion 33a, and a third other-side extending portion 33d extends from one end side of the third other-side slot accommodation portion 33e.

A third one-side terminal portion 33f extends from the other end side of the third one-side slot accommodation portion 33a, and a third other-side terminal portion 33g extends from the other end side of the third other-side slot accommodation portion 33e.

The directions to which the extending portions and the terminal portions of the third single coil 17c extend in the circumferential direction are the same as in the third single coil 16c in embodiment 1.

Figure 14:
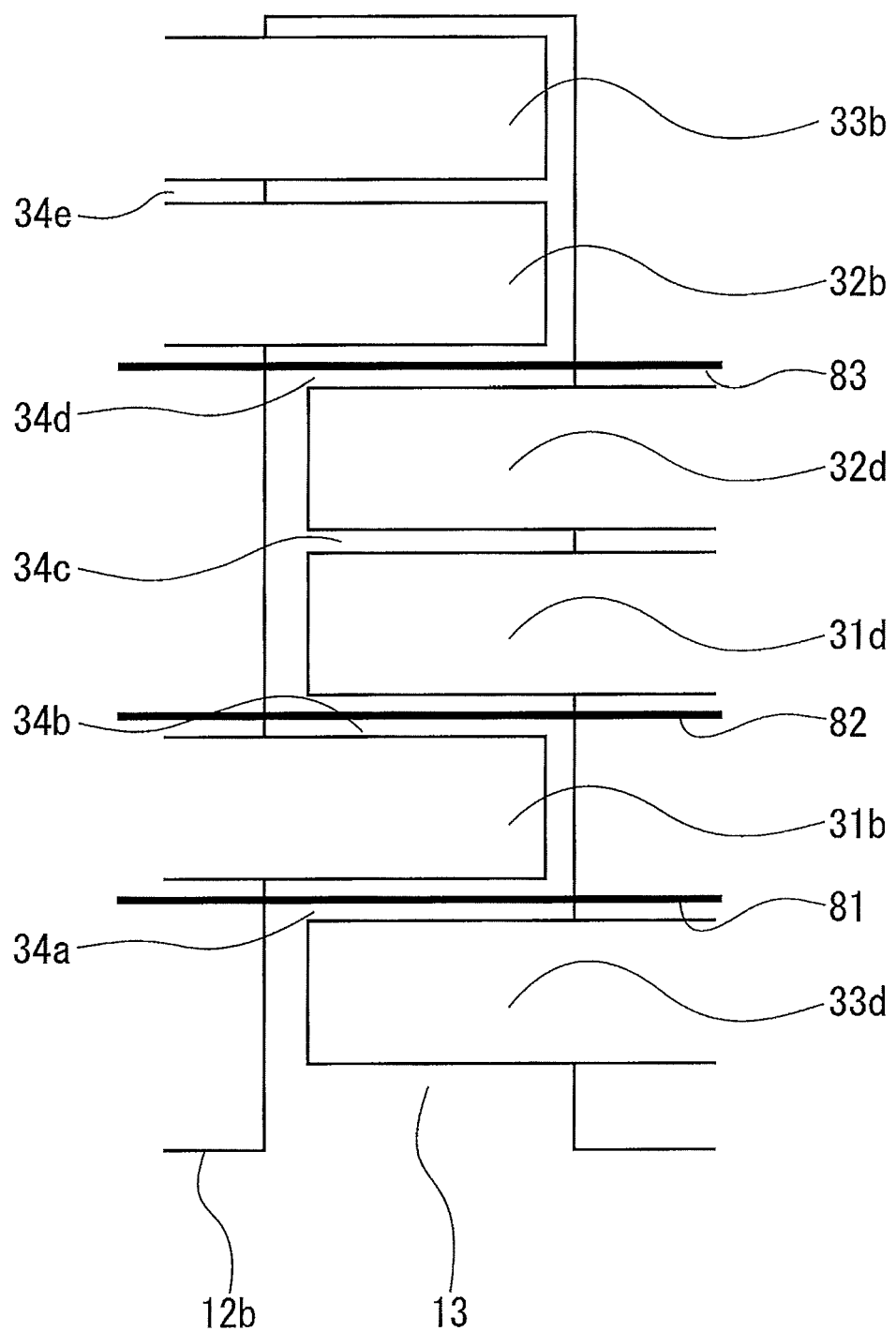
FIG. 14 is a schematic front view showing coil ends of the anti-wire-connection side in an armature according to embodiment 2 of the present invention.

FIG. 14 is a schematic front view showing coil ends of the anti-wire-connection side in the armature according to embodiment 2 of the present invention.

As shown in FIG. 14, the third single coil 17c having the third other-side slot accommodation portion 33e as the first layer, and the first single coil 17a having the first one-side slot accommodation portion 31a as the second layer, have the connection portions extending in directions opposite to each other and have phases different from each other. Therefore, voltage between the third other-side extending portion 33d which is the coil end of the third single coil 17c, and the first one-side extending portion 31b which is the coil end of the first single coil 17a, is greater than voltage between their respective slot accommodation portions in the first layer and the second layer adjacent to each other in the slot. Therefore, an insulation sheet 81 is provided in a coil end interval 34a between the third other-side extending portion 33d and the first one-side extending portion 31b.

The directions of the extending portions extending from the second-layer slot accommodation portion of the first single coil 17a, the third-layer slot accommodation portion of the first single coil 17a, the fourth-layer slot accommodation portion of the second single coil 17b, and the fifth-layer slot accommodation portion of the second single coil 17b are the same as those in embodiment 1. Therefore, an insulation sheet 82 is provided in a coil end interval 34b between the first one-side extending portion 31b and the first other-side extending portion 31d, no insulation sheet is provided in a coil end interval 34c between the first other-side extending portion 31d and the second other-side extending portion 32d, and an insulation sheet 83 is provided in a coil end interval 34d between the second other-side extending portion 32d and the second one-side extending portion 32b.

The second single coil 17b having the second one-side slot accommodation portion 32a as the fifth layer, and the third single coil 17c having the third one-side slot accommodation portion 33a as the sixth layer, have the connection portions extending in the same direction and have the same phase. Therefore, voltage between the second one-side extending portion 32b which is the coil end of the second single coil 17b, and the third one-side extending portion 33b which is the coil end of the third single coil 17c, is the same as voltage between the slot accommodation portions in the fifth layer and the sixth layer adjacent to each other in the slot. Therefore, no insulation sheet is provided in a coil end interval 34e between the second one-side extending portion 32b and the third one-side extending portion 33b.

Also in the rotating electric machine using the first single coil 17a, the second single coil 17b, and the third single coil 17c in the present embodiment, it is not necessary to provide insulation sheets in all the coil end intervals on the anti-wire-connection side and the wire-connection side (not shown). Therefore, the same effect as in the rotating electric machine in embodiment 1 can be obtained.

In the present embodiment, no insulation sheet is provided in the coil end interval on the radially outermost side, and an insulation sheet is provided in the coil end interval on the radially innermost side. Thus, the amount of insulation sheets needed around the circumference decreases, and the material cost can be reduced.

Also in the present embodiment, insulation sheets are used as the insulators provided in coil end intervals, but insulation films may be used.

In the armature of the present embodiment, as shown in FIG. 14, in the case where the armature coil is configured by six layers of slot accommodation portions corresponding to (4n+2) layers (n is a natural number) at n=1, at the coil ends on the anti-wire-connection side, the connection portions extending from the slot accommodation portions in the second layer, the fifth layer which is the (4n+1)th layer, and the sixth layer which is the (4n+2)th layer, extend toward a direction, in the circumferential direction, opposite to the connection portion extending from the slot accommodation portion in the first layer.

In addition, the connection portions extending from the slot accommodation portions in the third layer which is the (4n−1)th layer and the fourth layer which is the (4n)th layer extend toward the same direction in the circumferential direction as the connection portion extending from the slot accommodation portion in the first layer.

In the armature of the present embodiment, in the armature coil, insulation sheets are provided between connection portions that are adjacent in the radial direction and extend toward directions different from each other in the circumferential direction, and no insulation sheet is provided between connection portions that are adjacent in the radial direction and extend toward the same direction in the circumferential direction.

Embodiment 3

A rotating electric machine in the present embodiment is the same as the rotating electric machine 100 in embodiment 1 except that a plurality of single coils 60 respectively formed by one conductive wire are arranged so as to be shifted from each other in the circumferential direction, to form an armature coil.

Figure 15:
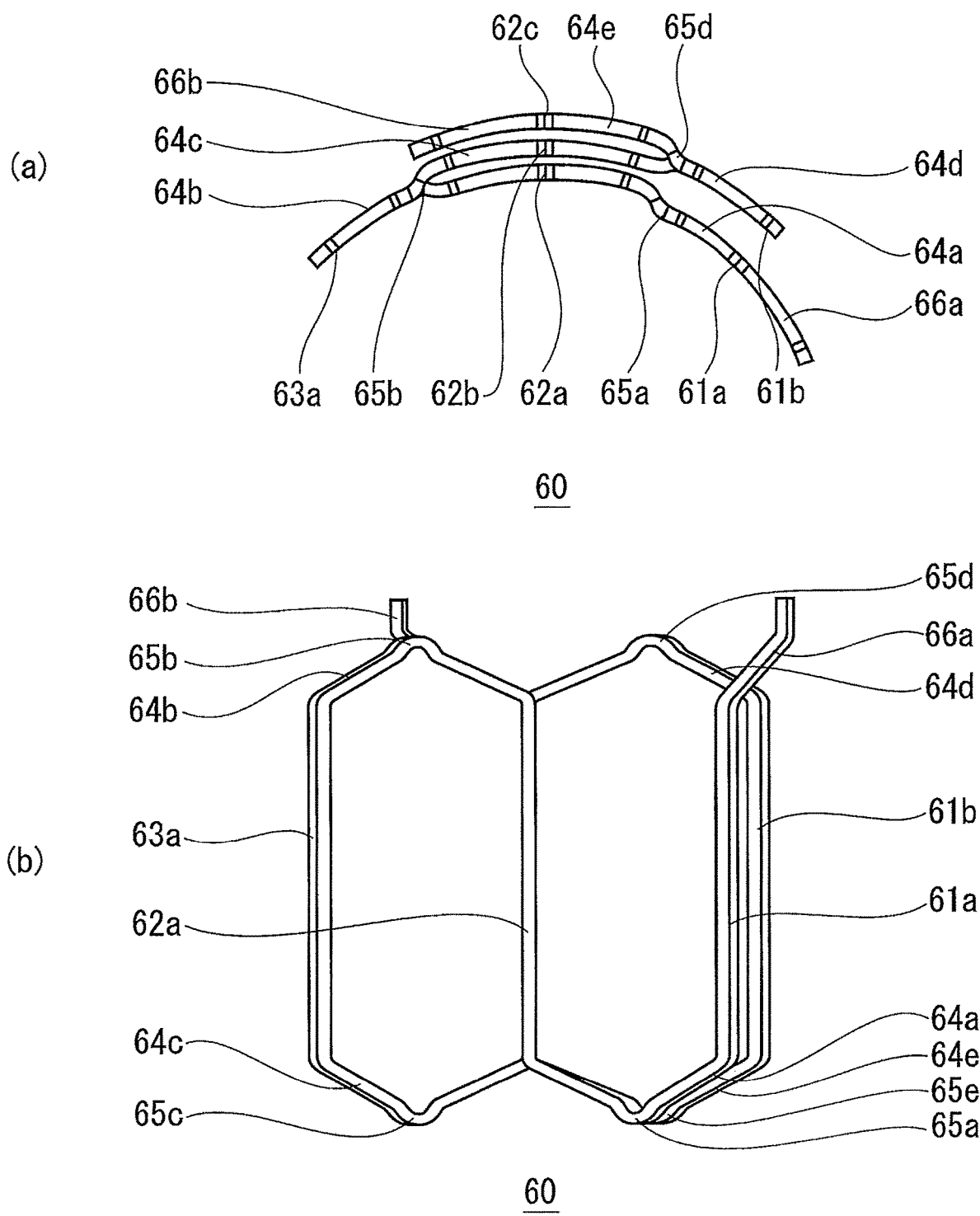
FIG. 15 is a schematic top view (a) and a schematic front view (b) of a single coil forming an armature coil in a rotating electric machine according to embodiment 3 of the present invention.

FIG. 15 is a schematic top view (a) and a schematic front view (b) of the single coil forming the armature coil in the rotating electric machine according to embodiment 3 of the present invention.

Figure 16:
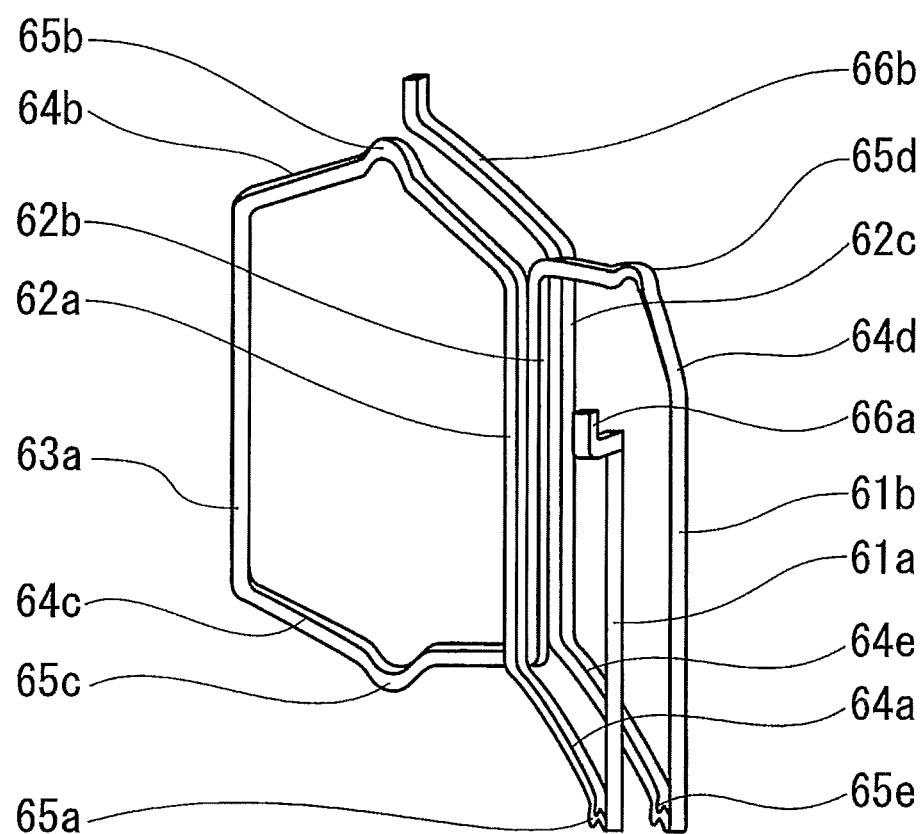
FIG. 16 is a schematic perspective view of the single coil forming the armature coil in the rotating electric machine according to embodiment 3 of the present invention.

FIG. 16 is a schematic perspective view of the single coil forming the armature coil in the rotating electric machine according to embodiment 3 of the present invention.

As shown in FIG. 15 and FIG. 16, in the single coil 60 of the present embodiment, slot accommodation portions to form respective layers from the first layer to the sixth layer arranged in the slot 13 are formed by one conductive wire.

As shown in FIG. 15, in the single coil 60, a first slot accommodation portion 61a and a fifth slot accommodation portion 61b are located at one end in the circumferential direction, a third slot accommodation portion 63a is located at the other end in the circumferential direction, and a second slot accommodation portion 62a, a fourth slot accommodation portion 62b, and a sixth slot accommodation portion 62c are located at the center in the circumferential direction.

The slot accommodation portions at one end in the circumferential direction are separated from the slot accommodation portions at the center in the circumferential direction with a predetermined number of slots interposed therebetween, and the slot accommodation portion at the other end in the circumferential direction is also separated from the slot accommodation portions at the center in the circumferential direction with a predetermined number of slots interposed therebetween.

A first terminal portion 66a extends toward one side in the circumferential direction from one end of the first slot accommodation portion 61a, and a second terminal portion 66b extends toward the other side in the circumferential direction from one end of the sixth slot accommodation portion 62c.

In FIG. 15(b) and FIG. 16, the upper side in the drawings in which the first terminal portion 66a and the second terminal portion 66b are present is a coil end of the wire-connection side, and the lower side in the drawing is a coil end of the anti-wire-connection side. The first terminal portion 66a is connected, by welding or the like, to the second terminal portion 66b of another single coil 60 on one side in the circumferential direction, and the second terminal portion 66b is connected, by welding or the like, to the first terminal portion 66a of another single coil 60 on the other side in the circumferential direction.

In the single coil 60, the first slot accommodation portion 61a becomes the first layer, the second slot accommodation portion 62a becomes the second layer, the third slot accommodation portion 63a becomes the third layer, the fourth slot accommodation portion 62b becomes the fourth layer, the fifth slot accommodation portion 61b becomes the fifth layer, and the sixth slot accommodation portion 62c becomes the sixth layer.

The other end of the first slot accommodation portion 61a and the other end of the second slot accommodation portion 62a are connected by a first connection portion 64a. The first connection portion 64a has a first shift portion 65a by which the second slot accommodation portion 62a is shifted outward in the radial direction by one layer from the first slot accommodation portion 61a.

One end of the second slot accommodation portion 62a and one end of the third slot accommodation portion 63a are connected by a second connection portion 64b. The second connection portion 64b has a second shift portion 65b by which the third slot accommodation portion 63a is shifted outward in the radial direction by one layer from the second slot accommodation portion 62a.

The other end of the third slot accommodation portion 63a and the other end of the fourth slot accommodation portion 62b are connected by a third connection portion 64c. The third connection portion 64c has a third shift portion 65c by which the fourth slot accommodation portion 62b is shifted outward in the radial direction by one layer from the third slot accommodation portion 63a.

One end of the fourth slot accommodation portion 62b and one end of the fifth slot accommodation portion 61b are connected by a fourth connection portion 64d. The fourth connection portion 64d has a fourth shift portion 65d by which the fifth slot accommodation portion 61b is shifted outward in the radial direction by one layer from the fourth slot accommodation portion 62b.

The other end of the fifth slot accommodation portion 61b and the other end of the sixth slot accommodation portion 62c are connected by a fifth connection portion 64e. The fifth connection portion 64e has a fifth shift portion 65e by which the sixth slot accommodation portion 62c is shifted outward in the radial direction by one layer from the fifth slot accommodation portion 61b.

In the present embodiment, the connection portions and the terminal portions on one end side of the slot accommodation portions are coil ends on the wire-connection side, and the connection portions on the other end side of the slot accommodation portions are coil ends on the anti-wire-connection side.

In each single coil 60, the first slot accommodation portion 61a of the other single coil 60 positioned on the other side in the circumferential direction is located radially inward with respect to the second slot accommodation portion 62a, and the fifth slot accommodation portion 61b of the other single coil 60 positioned on the other side in the circumferential direction is located between the fourth slot accommodation portion 62b and the sixth slot accommodation portion 62c.

The third slot accommodation portion 63a of another single coil 60 positioned on one side in the circumferential direction is located between the second slot accommodation portion 62a and the fourth slot accommodation portion 62b.

In the present embodiment, the second connection portion 64b and the fourth connection portion 64d are coil ends on the wire-connection side, and the first connection portion 64a, the third connection portion 64c, and the fifth connection portion 64e are coil ends on the anti-wire-connection side.

That is, on the anti-wire-connection side, in the same slot 13, the connection portion extending in the circumferential direction from the second slot accommodation portion 62a and the connection portion extending in the circumferential direction from the third slot accommodation portion 63a extend toward a direction opposite to the connection portion extending in the circumferential direction from the first slot accommodation portion 61a. And the connection portion extending in the circumferential direction from the fourth slot accommodation portion 62b and the connection portion extending in the circumferential direction from the fifth slot accommodation portion 61b extend toward the same direction as the connection portion extending in the circumferential direction from the first slot accommodation portion 61a. Further the connection portion extending in the circumferential direction from the sixth slot accommodation portion 62c extends toward a direction opposite to the connection portion extending in the circumferential direction from the first slot accommodation portion 61a.

On the wire-connection side, the connection portion extending in the circumferential direction from the second slot accommodation portion 62a extends toward a direction opposite to the terminal portion extending in the circumferential direction from the first slot accommodation portion 61a, the connection portion extending in the circumferential direction from the third slot accommodation portion 63a and the connection portion extending in the circumferential direction from the fourth slot accommodation portion 62b extend toward the same direction as the terminal portion extending in the circumferential direction from the first slot accommodation portion 61a, and the connection portion extending in the circumferential direction from the fifth slot accommodation portion 61b and the terminal portion extending in the circumferential direction from the sixth slot accommodation portion 62c extend toward a direction opposite to the terminal portion extending in the circumferential direction from the first slot accommodation portion 61a.

Figure 17:
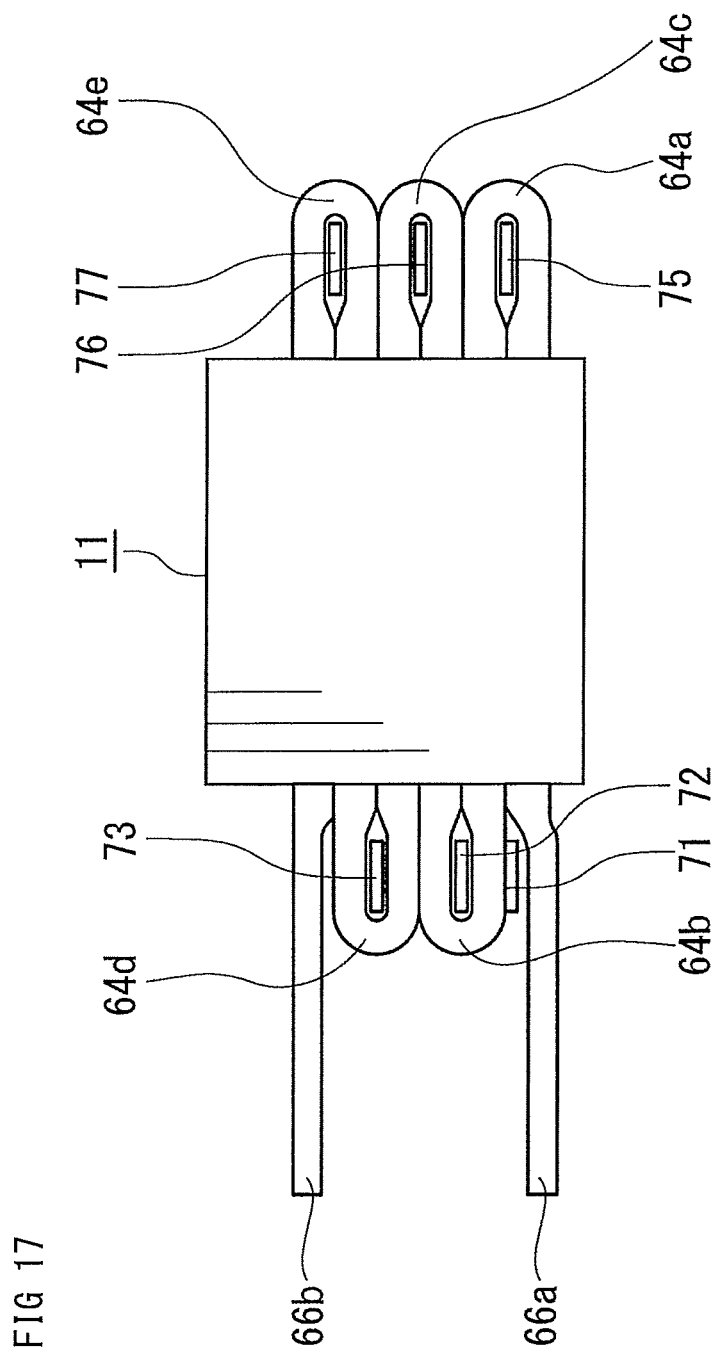
FIG. 17 is a schematic side view showing the state of coils arranged in slots of an armature in the rotating electric machine according to embodiment 3 of the present invention.

FIG. 17 is a schematic side view showing the state of coils arranged in the slots of the armature in the rotating electric machine according to embodiment 3 of the present invention.

As shown in FIG. 17, at the coil ends on the anti-wire-connection side at the right on the drawing, in the single coil 60, the connection portion extending from the first layer and the connection portion extending from the second layer extend toward directions opposite to each other in the circumferential direction and have phases different from each other. And the connection portion extending from the third layer and the connection portion extending from the fourth layer extend toward directions opposite to each other in the circumferential direction and have phases different from each other. Further the connection portion extending from the fifth layer and the connection portion extending from the sixth layer extend toward directions opposite to each other in the circumferential direction and have phases different from each other. Therefore, insulation sheets 75, 76, 77 are provided in the coil end intervals between these pairs of connection portions, and no insulation sheet is provided in the coil end intervals between the other pairs of layers.

At the coil ends on the wire-connection side, in the single coil 60, the terminal portion extending from the first layer and the connection portion extending from the second layer extend toward directions opposite to each other in the circumferential direction and have phases different from each other. And the connection portion extending from the second layer and the connection portion extending from the third layer extend toward directions opposite to each other in the circumferential direction and have phases different from each other. Further the connection portion extending from the fourth layer and the connection portion extending from the fifth layer extend toward directions opposite to each other in the circumferential direction and have phases different from each other. Therefore, insulation sheets 71, 72, 73 are provided in the coil end intervals between these pairs of connection portions, and no insulation sheet is provided in the coil end intervals between the other pairs of layers.

Also in the rotating electric machine of the present embodiment, the number of insulation sheets for insulating the coil ends of the armature from each other can be decreased, and thus the same effect as in the rotating electric machine of embodiment 1 can be obtained.

In addition, since the armature coil is formed by arranging single coils respectively, formed by one conductive wire, the number of components and the number of welding locations can be decreased. Thus, also in this point, the productivity can be improved.

The direction to which the first terminal portion 66*a* extends and the direction to which the second terminal portion 66*b* extends may be reversed in the circumferential direction. In this case, at the coil ends on the wire-connection side, an insulation sheet is provided between the connection portion extending from the fifth layer and the terminal portion extending from the sixth layer, and it is not necessary to provide an insulation sheet between the terminal portion extending from the first layer and the connection portion extending from the second layer.

In the present embodiment, the slot in which the slot accommodation portion on one side in the circumferential direction of the single coil is arranged and the slot in which the slot accommodation portion at the center of the single coil is arranged are separated from each other with five slots interposed therebetween in the circumferential direction, and the slot in which the slot accommodation portion on the other side in the circumferential direction of the single coil is arranged and the slot in which the slot accommodation portion at the center of the single coil is arranged are separated from each other with five slots interposed therebetween in the circumferential direction. However, the number of the slots is not limited to five.

Also in the present embodiment, insulation sheets are used as the insulators provided in coil end intervals, but insulation films may be used.

The single coil 60 in the present embodiment has six slot accommodation portions from the first slot accommodation portion to the sixth slot accommodation portion, and six layers of slot accommodation portions are provided in each slot. However, the single coil may have ten slot accommodation portions from the first slot accommodation portion to the tenth slot accommodation portion so that ten layers of slot accommodation portions are provided in each slot.

The single coil may have more than ten slot accommodation portions as long as the single coil have (4n+2) number (n is a natural number) of slot accommodation portions in the same manner in which the single coil has six slot accommodation portions and the single coil has ten slot accommodation portions.

Figure 18:
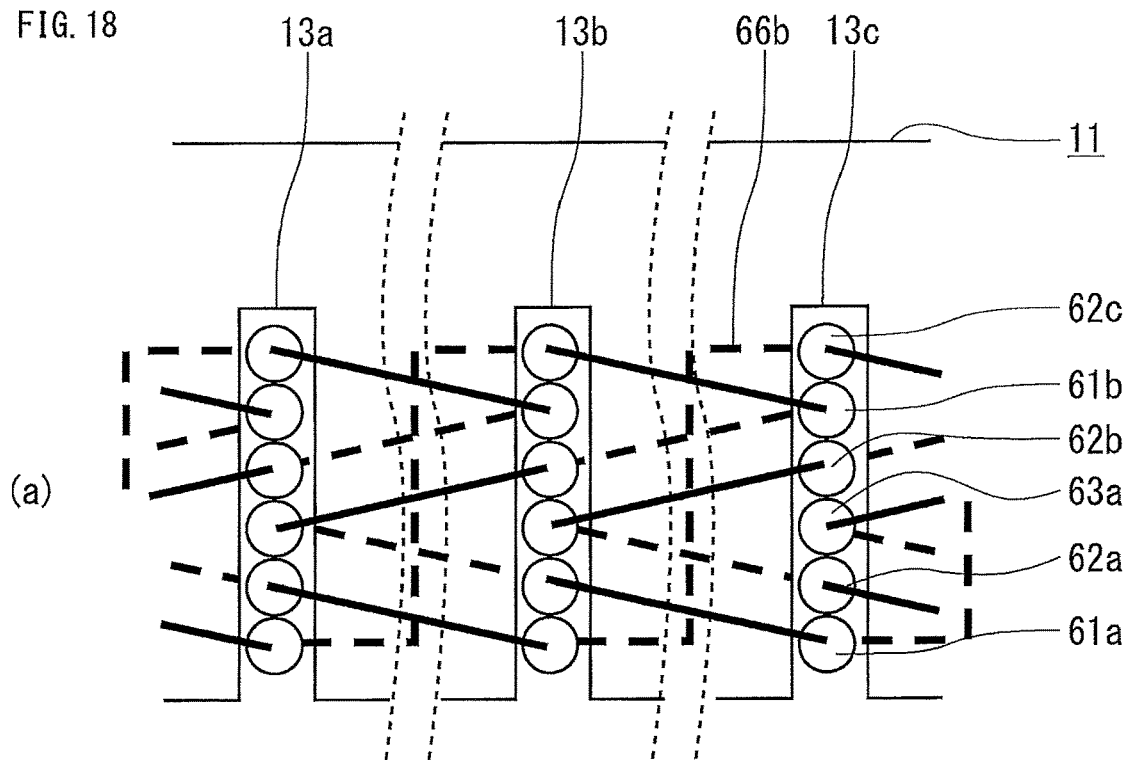
FIG. 18 is schematic top views illustrating the state (a) in which six layers of slot accommodation portions are arranged in each slot and the state (b) in which ten layers of slot accommodation portions are arranged in each slot, in the armature coil according to embodiment 3 of the present invention.
Figure 18:
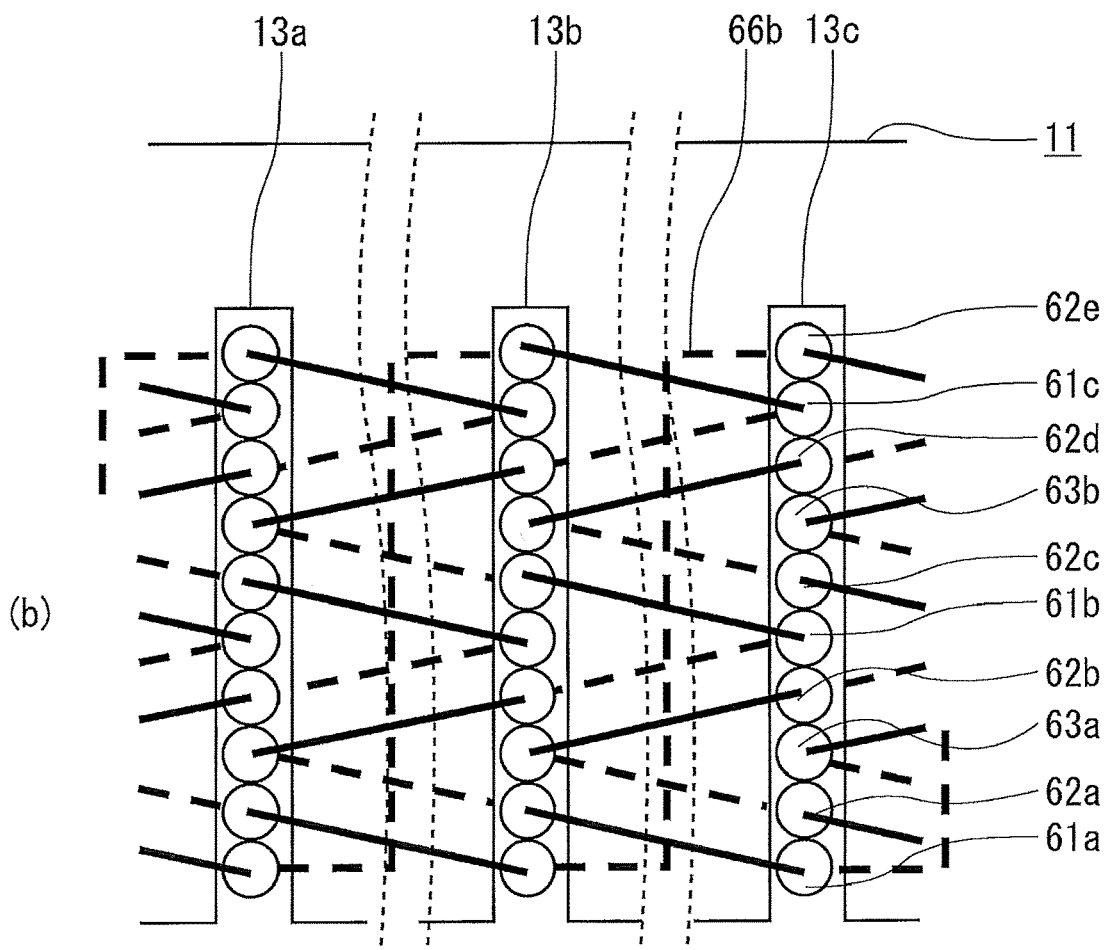

FIG. 18 is schematic top views illustrating the state (a) in which six layers of slot accommodation portions are arranged in each slot and the state (b) in which ten layers of slot accommodation portions are arranged in each slot, in the armature coil according to embodiment 3 of the present invention.

In FIG. 18, for convenience of description, the teeth 12*b* and the slots 13 annularly arranged in the armature core 11 are shown in a developed manner in a straight line.

In FIG. 18, the slots are referred to as a first slot 13*a*, a second slot 13*b*, and then a third slot 13*c*, from the left in the drawing.

In FIG. 18, the connection portions which are the coil ends on the anti-wire-connection side are indicated by solid lines, and connections by the terminal portions which are the coil ends on the wire-connection side are indicated by broken lines.

As shown in FIG. 18, the single coil having ten slot accommodation portions is formed by connecting, to the wire-connection-side end of the sixth slot accommodation portion 62*c* of the single coil 60 excluding the second terminal portion 66*b*, the same structure as that from the wire-connection-side end of the second slot accommodation portion 62*a* to the wire-connection-side end of the sixth slot accommodation portion 62*c* so that a seventh slot accommodation portion 63*b*, an eighth slot accommodation portion 62*d*, a ninth slot accommodation portion 61*c* and a tenth slot accommodation portion 62*e* are formed. Then the second terminal portion 66*b* is provided at the wire-connection-side end of the tenth slot accommodation portion 62*e*.

In addition, a single coil having more slot accommodation portions is obtained by further adding the same structure as that from the wire-connection-side end of the second slot accommodation portion 62*a* to the wire-connection-side end of the sixth slot accommodation portion 62*c*.

The armature coil of the armature in the present embodiment is configured by using single coils each having (4n+2) number of slot accommodation portions.

At n=1, in the case of using the single coils 60 having six slot accommodation portions, at the coil ends of the anti-wire-connection side, the connection portions extending from the slot accommodation portion in the fourth layer which is the (4n)th layer and the slot accommodation portion in the fifth layer which is the (4n+1)th layer, extend toward the same direction in the circumferential direction as the connection portion extending from the slot accommodation portion in the first layer.

In addition, the connection portions extending from the slot accommodation portions in the second layer, the third layer which is the (4n−1)th layer, and the sixth layer which is the (4n+2)th layer, extend toward a direction, in the circumferential direction, opposite to the connection portion extending from the slot accommodation portion in the first layer.

At n=2, in the case of using the single coils having ten slot accommodation portions, at the coil ends of the anti-wire-connection side, the connection portions extending from the slot accommodation portions in the fourth and eighth layers which are the (4n)th layers and the slot accommodation portions in the fifth and ninth layers which are the (4n+1)th layers, extend toward the same direction in the circumferential direction as the connection portion extending from the slot accommodation portion in the first layer.

In addition, the connection portions extending from the slot accommodation portion in the second layer, the slot accommodation portions in the third and seventh layers which are the (4n−1)th layers, and the slot accommodation portions in the sixth and tenth layers which are the (4n+2)th layers, extend toward a direction, in the circumferential direction, opposite to the connection portion extending from the slot accommodation portion in the first layer.

Also at n=3 or greater, in the case of using the single coils having (4n+2) number of slot accommodation portions, the connection portions extending from the first layer, the second layer, the (4n−1)th layer, the (4n)th layer, the (4n+1)th layer, and the (4n+2)th layer extend in the same manner in the circumferential direction as in the case of using the single coils having six or ten slot accommodation portions.

In the armature of the present embodiment, in the armature coil, insulation sheets are provided between connection portions that are adjacent in the radial direction and extend toward directions different from each other in the circumferential direction, and no insulation sheet is provided between connection portions that are adjacent in the radial direction and extend toward the same direction in the circumferential direction.

Embodiment 4

A rotating electric machine in the present embodiment is the same as the rotating electric machine 100 in embodiment 1 except that a plurality of single coils 90 respectively formed by one conductive wire are arranged so as to be shifted from each other in the circumferential direction, to form an armature coil.

Figure 19:
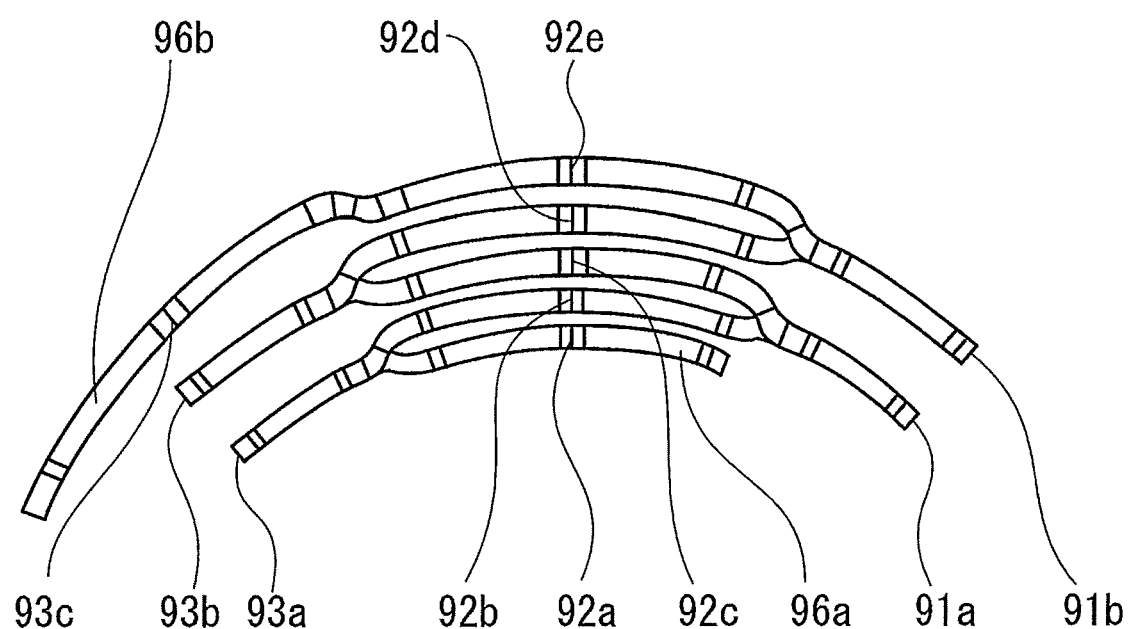
FIG. 19 is a schematic top view of a single coil forming an armature coil in a rotating electric machine according to embodiment 4 of the present invention.

FIG. 19 is a schematic top view of a single coil forming an armature coil in the rotating electric machine according to embodiment 4 of the present invention.

Figure 20:
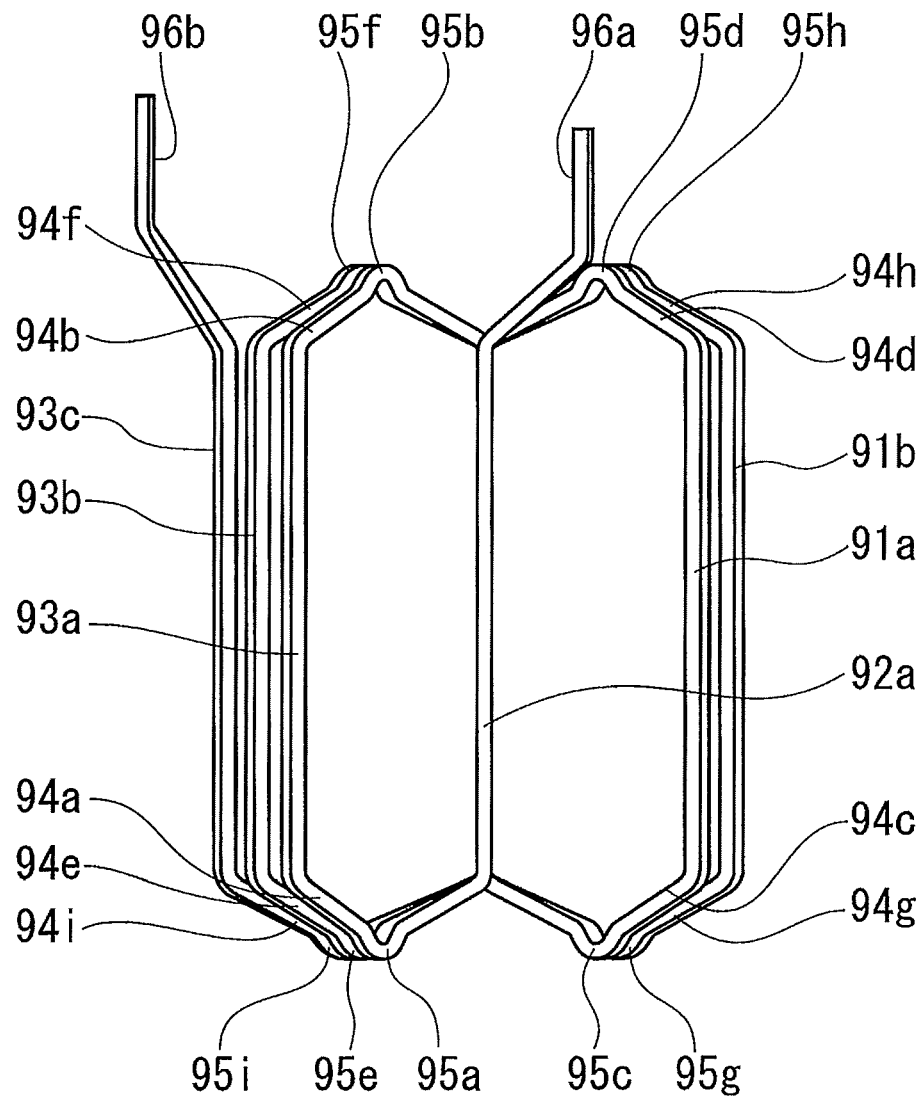
FIG. 20 is a schematic front view of the single coil forming the armature coil in the rotating electric machine according to embodiment 4 of the present invention.

FIG. 20 is a schematic front view of the single coil forming the armature coil in the rotating electric machine according to embodiment 4 of the present invention.

Figure 21:
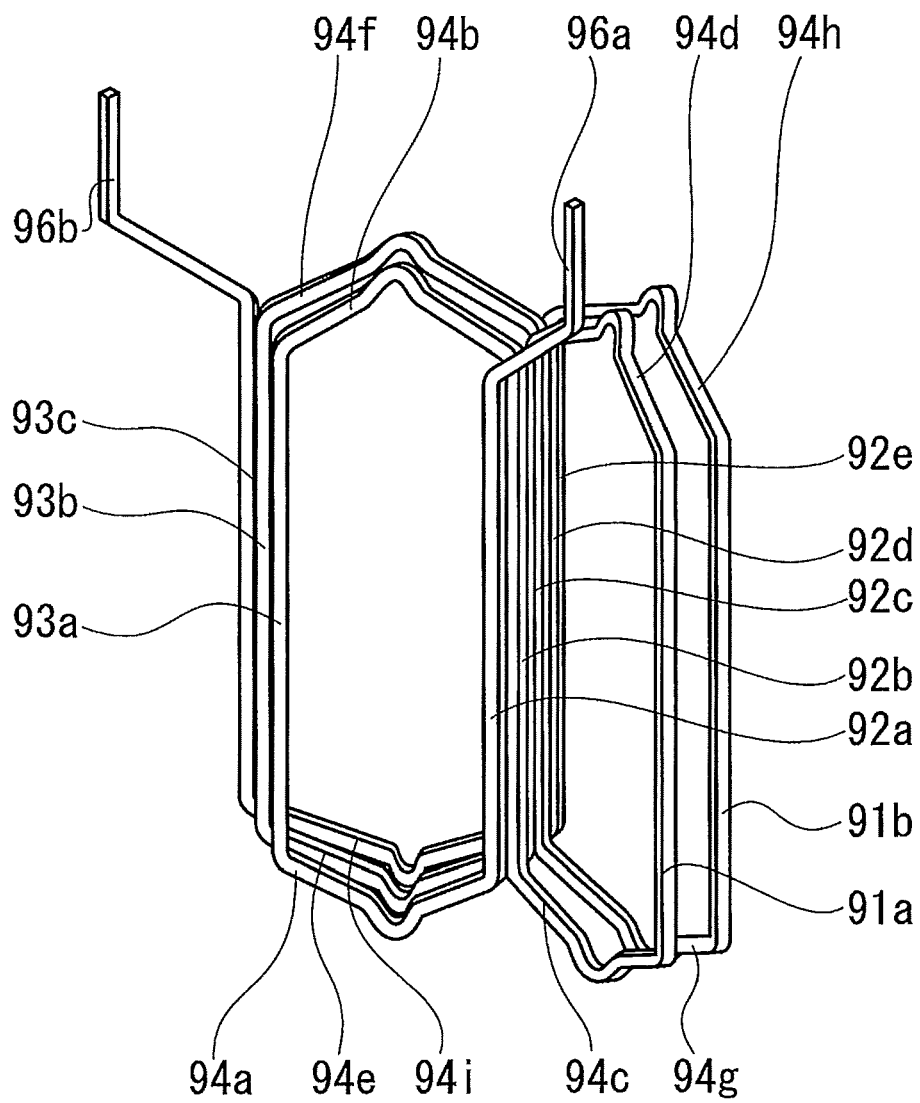
FIG. 21 is a schematic perspective view of the single coil forming the armature coil of the rotating electric machine according to embodiment 4 of the present invention.

FIG. 21 is a schematic perspective view of the single coil forming the armature coil of the rotating electric machine according to embodiment 4 of the present invention.

As shown in FIG. 19, FIG. 20, and FIG. 21, in the single coil 90 of the present embodiment, slot accommodation portions to form respective layers from the first layer to the tenth layer arranged in the slot 13 are formed by one conductive wire.

As shown in FIG. 19, FIG. 20, and FIG. 21, in the single coil 90, a first slot accommodation portion 92a, a third slot accommodation portion 92b, a fifth slot accommodation portion 92c, a seventh slot accommodation portion 92d, and a ninth slot accommodation portion 92e are located at the center in the circumferential direction.

In addition, a fourth slot accommodation portion 91a and an eighth slot accommodation portion 91b are located at one end in the circumferential direction, and a second slot accommodation portion 93a, a sixth slot accommodation portion 93b, and a tenth slot accommodation portion 93c are located at the other end in the circumferential direction.

The slot accommodation portions at one end in the circumferential direction are separated from the slot accommodation portions at the center in the circumferential direction with a predetermined number of slots interposed therebetween, and the slot accommodation portions at the other end in the circumferential direction are also separated from the slot accommodation portions at the center in the circumferential direction with a predetermined number of slots interposed therebetween.

A first terminal portion 96a extends toward one side in the circumferential direction from one end of the first slot accommodation portion 92a, and a second terminal portion 96b extends toward the other side in the circumferential direction from one end of the tenth slot accommodation portion 93c.

In FIG. 20 and FIG. 21, the upper side in the drawings in which the first terminal portion 96a and the second terminal portion 96b are present is a coil end of the wire-connection side, and the lower side in the drawings is a coil end of the anti-wire-connection side. The first terminal portion 96a is connected, by welding or the like, to the second terminal portion 96b of another single coil 90 on one side in the circumferential direction, and the second terminal portion 96b is connected, by welding or the like, to the first terminal portion 96a of another single coil 90 on the other side in the circumferential direction.

In the single coil 90, the first slot accommodation portion 92a becomes the first layer, the second slot accommodation portion 93a becomes the second layer, the third slot accommodation portion 92b becomes the third layer, the fourth slot accommodation portion 91a becomes the fourth layer, the fifth slot accommodation portion 92c becomes the fifth layer, the sixth slot accommodation portion 93b becomes the sixth layer, the seventh slot accommodation portion 92d becomes the seventh layer, the eighth slot accommodation portion 91b becomes the eighth layer, the ninth slot accommodation portion 92e becomes the ninth layer, and the tenth slot accommodation portion 93c becomes the tenth layer.

The other end of the first slot accommodation portion 92a and the other end of the second slot accommodation portion 93a are connected by a first connection portion 94a. The first connection portion 94a has a first shift portion 95a by which the second slot accommodation portion 93a is shifted outward in the radial direction by one layer from the first slot accommodation portion 92a.

One end of the second slot accommodation portion 93a and one end of the third slot accommodation portion 92b are connected by a second connection portion 94b. The second connection portion 94b has a second shift portion 95b by which the third slot accommodation portion 92b is shifted outward in the radial direction by one layer from the second slot accommodation portion 93a.

The other end of the third slot accommodation portion 92b and the other end of the fourth slot accommodation portion 91a are connected by a third connection portion 94c. The third connection portion 94c has a third shift portion 95c by which the fourth slot accommodation portion 91a is shifted outward in the radial direction by one layer from the third slot accommodation portion 92b.

One end of the fourth slot accommodation portion 91a and one end of the fifth slot accommodation portion 92c are connected by a fourth connection portion 94d. The fourth connection portion 94d has a fourth shift portion 95d by which the fifth slot accommodation portion 92c is shifted outward in the radial direction by one layer from the fourth slot accommodation portion 91a.

The other end of the fifth slot accommodation portion 92c and the other end of the sixth slot accommodation portion 93b are connected by a fifth connection portion 94e. The fifth connection portion 94e has a fifth shift portion 95e by which the sixth slot accommodation portion 93b is shifted outward in the radial direction by one layer from the fifth slot accommodation portion 92c.

One end of the sixth slot accommodation portion 93b and one end of the seventh slot accommodation portion 92d are connected by a sixth connection portion 94f. The sixth connection portion 94f has a sixth shift portion 95f by which the seventh slot accommodation portion 92d is shifted outward in the radial direction by one layer from the sixth slot accommodation portion 93b.

The other end of the seventh slot accommodation portion 92d and the other end of the eighth slot accommodation portion 91b are connected by a seventh connection portion 94g. The seventh connection portion 94g has a seventh shift portion 95g by which the eighth slot accommodation portion 91b is shifted outward in the radial direction by one layer from the seventh slot accommodation portion 92d.

One end of the eighth slot accommodation portion 91b and one end of the ninth slot accommodation portion 92e are connected by an eighth connection portion 94h. The eighth connection portion 94h has an eighth shift portion 95h by which the ninth slot accommodation portion 92e is shifted outward in the radial direction by one layer from the eighth slot accommodation portion 91b.

The other end of the ninth slot accommodation portion 92e and the other end of the tenth slot accommodation portion 93c are connected by a ninth connection portion 94i. The ninth connection portion 94i has a ninth shift portion 95i by which the tenth slot accommodation portion 93c is shifted outward in the radial direction by one layer from the ninth slot accommodation portion 92e.

In the present embodiment, the connection portions and the terminal portions on one end side of the slot accommodation portions are coil ends on the wire-connection side, and the connection portions on the other end side of the slot accommodation portions are coil ends on the anti-wire-connection side.

In each single coil 90, the second slot accommodation portion 93a of the other single coil 90 positioned on one side in the circumferential direction is located between the first slot accommodation portion 92a and the third slot accommodation portion 92b, and the sixth slot accommodation portion 93b of the other single coil 90 positioned on one side in the circumferential direction is located between the fifth slot accommodation portion 92c and the seventh slot accommodation portion 92d.

In addition, the fourth slot accommodation portion 91a of another single coil 90 positioned on the other side in the circumferential direction is located between the third slot accommodation portion 92b and the fifth slot accommodation portion 92c, and the eighth slot accommodation portion 91b of another single coil 90 positioned on the other side in the circumferential direction is located between the seventh slot accommodation portion 92d and the ninth slot accommodation portion 92e.

In addition, the tenth slot accommodation portion 93c of the other single coil 90 positioned on one side in the circumferential direction is located radially outward with respect to the ninth slot accommodation portion 92e.

In the present embodiment, the second connection portion 94b, the fourth connection portion 94d, the sixth connection portion 94f, and the eighth connection portion 94h are coil ends on the wire-connection side, and the first connection portion 94a, the third connection portion 94c, the fifth connection portion 94e, the seventh connection portion 94g, and the ninth connection portion 94i are coil ends on the anti-wire-connection side.

Figure 22:
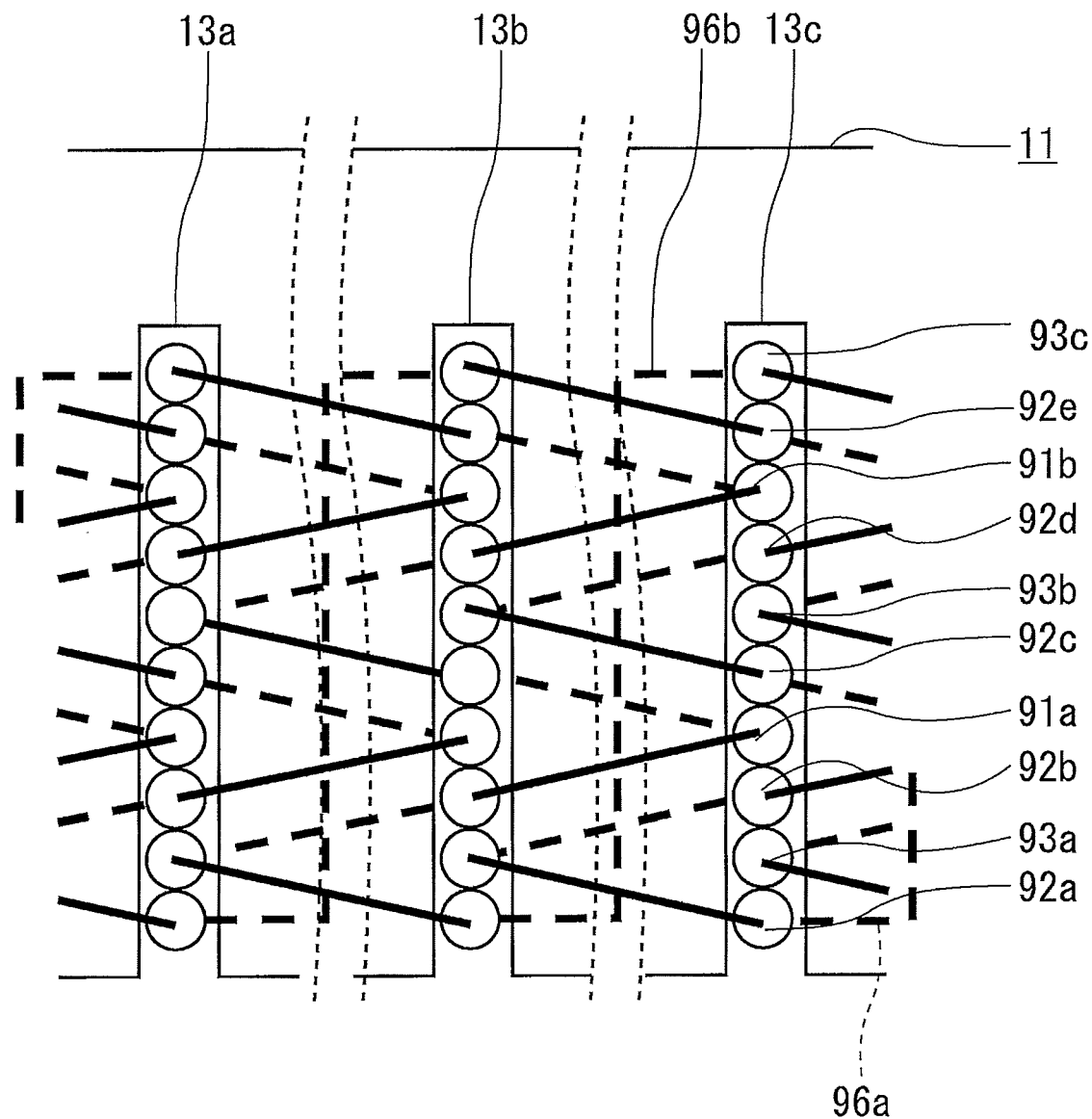
FIG. 22 is a schematic top view illustrating the state in which ten layers of slot accommodation portions are arranged in each slot, in the armature coil according to embodiment 4 of the present invention.

FIG. 22 is a schematic top view illustrating the state in which ten layers of slot accommodation portions are arranged in each slot, in the armature coil according to embodiment 4 of the present invention.

In FIG. 22, for convenience of description, the teeth 12b and the slots 13 annularly arranged in the armature core 11 are shown in a developed manner in a straight line.

In FIG. 22, the slots are referred to as a first slot 13a, a second slot 13b, and then a third slot 13c, from the left in the drawing.

In FIG. 22, connections by the connection portions which are the coil ends on the anti-wire-connection side are indicated by solid lines, and connections by the terminal portions which are the coil ends on the wire-connection side are indicated by broken lines.

As shown in FIG. 22, on the anti-wire-connection side, in the same slot 13, the connection portions extending in the circumferential direction from the second slot accommodation portion 93a, the third slot accommodation portion 92b, the sixth slot accommodation portion 93b, the seventh slot accommodation portion 92d, and the tenth slot accommodation portion 93c extend toward a direction opposite to the connection portion extending in the circumferential direction from the first slot accommodation portion 92a.

In addition, the connection portions extending in the circumferential direction from the fourth slot accommodation portion 91a, the fifth slot accommodation portion 92c, the eighth slot accommodation portion 91b, and the ninth slot accommodation portion 92e extend toward the same direction as the connection portion extending in the circumferential direction from the first slot accommodation portion 92a.

On the wire-connection side, in the same slot 13, the connection portions extending in the circumferential direction from the third slot accommodation portion 92b, the fourth slot accommodation portion 91a, the seventh slot accommodation portion 92d, and the eighth slot accommodation portion 91b, and the second terminal portion 96b extending in the circumferential direction from the tenth slot accommodation portion 93c, extend toward a direction opposite to the first terminal portion 96a extending in the circumferential direction from the first slot accommodation portion 92a.

In addition, the connection portions extending in the circumferential direction from the second slot accommodation portion 93a, the fifth slot accommodation portion 92c, the sixth slot accommodation portion 93b, and the ninth slot accommodation portion 92e extend toward the same direction as the first terminal portion 96a extending in the circumferential direction from the first slot accommodation portion 92a.

That is, at the coil ends on the anti-wire-connection side, in the single coil 90, the connection portion extending from the first layer and the connection portion extending from the second layer extend toward directions different from each other in the circumferential direction and have phases different from each other, the connection portion extending from the third layer and the connection portion extending from the fourth layer extend toward directions different from each other in the circumferential direction and have phases different from each other, the connection portion extending from the fifth layer and the connection portion extending from the sixth layer extend toward directions different from each other in the circumferential direction and have phases different from each other, the connection portion extending from the seventh layer and the connection portion extending from the eighth layer extend toward directions different from each other in the circumferential direction and have phases different from each other, and the connection portion extending from the ninth layer and the connection portion extending from the tenth layer extend toward directions different from each other in the circumferential direction and have phases different from each other. Therefore, insulation sheets are provided in the coil end intervals between these pairs of connection portions, and no insulation sheet is provided in the coil end intervals between the other pairs of layers.

At the coil ends on the wire-connection side, in the single coil 90, the connection portion extending from the second layer and the connection portion extending from the third layer extend toward directions different from each other in the circumferential direction and have phases different from each other, the connection portion extending from the fourth layer and the connection portion extending from the fifth layer extend toward directions different from each other in the circumferential direction and have phases different from each other, the connection portion extending from the sixth layer and the connection portion extending from the seventh layer extend toward directions different from each other in the circumferential direction and have phases different from each other, the connection portion extending from the eighth layer and the connection portion extending from the ninth layer extend toward directions different from each other in the circumferential direction and have phases different from each other, and the connection portion extending from the ninth layer and the terminal portion extending from the tenth layer extend toward directions different from each other in the circumferential direction and have phases different from each other. Therefore, insulation sheets are provided in the coil end intervals between these pairs of connection portions and between the connection portion and the terminal portion. And no insulation sheet is provided in the coil end intervals between the other pairs of layers.

Also in the rotating electric machine of the present embodiment, the number of insulation sheets for insulating the coil ends of the armature from each other can be decreased, and thus the same effect as in the rotating electric machine of embodiment 1 can be obtained.

In addition, since the armature coil is formed by arranging single coils respectively formed by one conductive wire, the number of components and the number of welding locations can be decreased. Thus, also in this point, the productivity can be improved.

In the present embodiment, the slot in which the slot accommodation portion on one side in the circumferential direction of the single coil is arranged and the slot in which the slot accommodation portion at the center in the circumferential direction of the single coil is arranged are separated from each other with five slots interposed therebetween in the circumferential direction, and the slot in which the slot accommodation portion on the other side in the circumferential direction of the single coil is arranged and the slot in which the slot accommodation portion in the circumferential direction at the center of the single coil is arranged are separated from each other with five slots interposed therebetween in the circumferential direction. However, the number of the slots is not limited to five.

Also in the present embodiment, insulation sheets are used as the insulators provided in coil end intervals, but insulation films may be used.

The single coil 90 in the present embodiment has ten slot accommodation portions from the first slot accommodation portion to the tenth slot accommodation portion, and ten layers of slot accommodation portions are provided in each slot. However, the single coil may have six slot accommodation portions from the first slot accommodation portion to the sixth slot accommodation portion so that six layers of slot accommodation portions are provided in each slot.

Alternatively, the single coil may have fourteen slot accommodation portions from the first slot accommodation portion to the fourteenth slot accommodation portion so that fourteen layers of slot accommodation portions are provided in each slot.

That is, the single coil may have $(4n+2)$ number (n is a natural number) of slot accommodation portions.

As is obvious from FIG. 22, the single coil having six slot accommodation portions can be formed by, in the single coil 90 having ten slot accommodation portions shown in FIG. 19 to FIG. 21, eliminating the structure subsequent to the sixth slot accommodation portion and providing the second terminal portion 96b at the wire-connection-side end of the sixth slot accommodation portion.

As is obvious from FIG. 19 to FIG. 22, the structure from the wire-connection-side end of the sixth slot accommodation portion to the wire-connection-side end of the tenth slot accommodation portion is the same as the structure from the wire-connection-side end of the second slot accommodation portion to the wire-connection-side end of the sixth slot accommodation portion.

That is, the single coil 90 having ten slot accommodation portions is formed by connecting, to the wire-connection-side end of the sixth slot accommodation portion of the single coil having six slot accommodation portions excluding the second terminal portion, the same structure as that from the wire-connection-side end of the second slot accommodation portion to the wire-connection-side end of the sixth slot accommodation portion so that seventh to tenth slot accommodation portions are formed. Then the second terminal portion 96b is provided at the wire-connection-side end of the tenth slot accommodation portion.

In addition, the single coil having fourteen slot accommodation portions can be formed by connecting, to the wire-connection-side end of the tenth slot accommodation portion of the single coil 90 having ten slot accommodation portions excluding the second terminal portion 96b, the same structure as that from the wire-connection-side end of the second slot accommodation portion to the wire-connection-side end of the sixth slot accommodation portion so that eleventh to fourteenth slot accommodation portions are formed. Then the second terminal portion 96b is provided at the wire-connection-side end of the fourteenth slot accommodation portion.

That is, the armature in which more layers of slot accommodation portions are arranged in each slot can be obtained by repeatedly providing the structure from the wire-connection-side end of the second slot accommodation portion to the wire-connection-side end of the sixth slot accommodation portion.

The armature coil of the armature in the present embodiment is configured by using single coils each having $(4n+2)$ number of slot accommodation portions.

As shown in FIG. 22, at $n=2$, in the case of using the single coils 90 having ten slot accommodation portions, at the coil ends of the anti-wire-connection side, the connection portions extending from the slot accommodation portions in the fourth and eighth layers which are the $(4n)$th layers and the slot accommodation portions in the fifth and ninth layers which are the $(4n+1)$th layers, extend toward the same direction in the circumferential direction as the connection portion extending from the slot accommodation portion in the first layer.

In addition, the connection portions extending from the slot accommodation portion in the second layer, the slot accommodation portions in the third and seventh layers which are the $(4n-1)$th layers, and the slot accommodation portions in the sixth and tenth layers which are the $(4n+2)$th layers, extend toward a direction, in the circumferential direction, opposite to the connection portion extending from the slot accommodation portion in the first layer.

Also at $n=1$ or $n=3$ or greater, in the case of using the single coil having $(4n+2)$ number of slot accommodation portions, the connection portions extending from the first layer, the second layer, the $(4n-1)$th layer, the $(4n)$th layer, the $(4n+1)$th layer, and the $(4n+2)$th layer extend in the same manner in the circumferential direction as in the case of using the single coil 90 having ten slot accommodation portions.

In the armature of the present embodiment, in the armature coil, insulation sheets are provided between connection portions that are adjacent in the radial direction and extend toward directions different from each other in the circumferential direction, and no insulation sheet is provided between connection portions that are adjacent in the radial direction and extend toward the same direction in the circumferential direction.

It is noted that, within the scope of the present invention, the above embodiments may be freely combined with each other, or each of the above embodiments may be modified or eliminated appropriately.

INDUSTRIAL APPLICABILITY

The rotating electric machine of the present invention is applicable to industrial devices required to have high productivity and low cost.

The invention claimed is:

1. A rotating electric machine comprising:
an armature; and
a rotor rotatably arranged on an inner circumferential side of the armature with a gap interposed therebetween, wherein
the armature includes an armature core, armature coils mounted to the armature core, and phase to phase insulators for insulating coil end parts of the armature coils,
the armature coils are formed such that (4n+2) number of slot accommodation portions of single coils forming the armature coils are arranged so as to be stacked in a radial direction in slots of the armature core, n being a natural number,
on an anti-wire-connection side, a coil end extending in a circumferential direction from the slot accommodation portion in a first layer on an innermost side in the radial direction in the slot and a coil end extending in the circumferential direction from the slot accommodation portion in a second layer extend toward the same direction, or a coil end extending in the circumferential direction from the slot accommodation portion in a (4n+1)th layer and a coil end extending in the circumferential direction from the slot accommodation portion in a (4n+2)th layer extend toward the same side, and
the phase to phase insulators are provided between the coil ends that extend toward directions opposite to each other in the circumferential direction and are adjacent in the radial direction, and the phase to phase insulator is not provided between the coil ends that extend toward the same direction in the circumferential direction and are adjacent in the radial direction.

2. The rotating electric machine according to claim 1, wherein
the single coils include a first single coil, a second single coil, and a third single coil, and the first single coil, the second single coil, and the third single coil are connected by terminal portions,
the first single coil includes a first one-side slot accommodation portion; a first other-side slot accommodation portion separated toward another side in the circumferential direction from the first one-side slot accommodation portion with a predetermined number of the slots interposed therebetween; and a first connection portion as the coil end, by which the first one-side slot accommodation portion and the first other-side slot accommodation portion are connected, the first connection portion having a first shift portion by which the first other-side slot accommodation portion is shifted upward in the radial direction by one layer from the first one-side slot accommodation portion,
the second single coil includes a second one-side slot accommodation portion; a second other-side slot accommodation portion separated toward another side in the circumferential direction from the second one-side slot accommodation portion with a predetermined number of the slots interposed therebetween; and a second connection portion as the coil end, by which the second one-side slot accommodation portion and the second other-side slot accommodation portion are connected, the second connection portion having a second shift portion by which the second one-side slot accommodation portion is shifted upward in the radial direction by one layer from the second other-side slot accommodation portion, and
the third single coil includes a third one-side slot accommodation portion; a third other-side slot accommodation portion separated toward another side in the circumferential direction from the third one-side slot accommodation portion with a predetermined number of the slots interposed therebetween; and a third connection portion as the coil end, by which the third one-side slot accommodation portion and the third other-side slot accommodation portion are connected, the third connection portion having a third shift portion by which the third other-side slot accommodation portion is shifted by (outermost layer−1) layers in the radial direction from the third one-side slot accommodation portion.

3. The rotating electric machine according to claim 2, wherein
by the third shift portion, the third other-side slot accommodation portion is shifted upward in the radial direction from the third one-side slot accommodation portion by (outermost layer−1) layers,
the first one-side slot accommodation portion forms the second layer and a (4n+2)th layer other than the outermost layer, the first other-side slot accommodation portion forms a (4n−1)th layer, the second other-side slot accommodation portion forms a (4n)th layer, the second one-side slot accommodation portion forms a (4n+1)th layer, the third one-side slot accommodation portion forms the first layer, and the third other-side slot accommodation portion forms an outermost (4n+2)th layer,
on the anti-wire-connection side, the coil end extending in the circumferential direction from the slot accommodation portion in the first layer and the coil end extending in the circumferential direction from the slot accommodation portion in the second layer extend toward the same direction, the coil end extending in the circumferential direction from the slot accommodation portion in the (4n−1)th layer and the coil end extending in the circumferential direction from the slot accommodation portion in the (4n)th layer extend toward a direction opposite to the coil end extending in the circumferential direction from the slot accommodation portion in the first layer, and the coil end extending in the circumferential direction from the slot accommodation portion in the (4n+1)th layer and the coil end extending in the circumferential direction from the slot accommodation portion in the (4n+2)th layer other than the outermost layer extend toward the same direction as the coil end extending in the circumferential direction from the slot accommodation portion in the first layer, and the coil end extending in the circumferential direction from the slot accommodation portion in the outermost (4n+2)th layer extends toward a direction opposite to the coil end extending in the circumferential direction from the slot accommodation portion in the first layer.

4. The rotating electric machine according to claim 2, wherein
by the third shift portion, the third one-side slot accommodation portion is shifted upward in the radial direction from the third other-side slot accommodation portion by (outermost layer−1) layers,
the first one-side slot accommodation portion forms the second layer and a (4n+2)th layer other than the outermost layer, the first other-side slot accommodation portion forms a (4n−1)th layer, the second other-side slot accommodation portion forms a (4n)th layer, the second one-side slot accommodation portion forms a (4n+1)th layer, the third one-side slot accommodation portion forms an outermost (4n+2)th layer, and the third other-side slot accommodation portion forms the first layer, and
on the anti-wire-connection side, the coil end extending in the circumferential direction from the slot accommodation portion in the second layer extends toward a direction opposite to the coil end extending in the circumferential direction from the slot accommodation portion in the first layer, the coil end extending in the circumferential direction from the slot accommodation portion in the (4n−1)th layer and the coil end extending in the circumferential direction from the slot accommodation portion in the (4n)th layer extend toward the same direction as the coil end extending in the circumferential direction from the slot accommodation portion in the first layer, and the coil end extending in the circumferential direction from the slot accommodation portion in the (4n+1)th layer and the coil end extending in the circumferential direction from the slot accommodation portion in the (4n+2)th layer extend toward a direction opposite to the coil end extending in the circumferential direction from the slot accommodation portion in the first layer.

5. A rotating electric machine comprising:
an armature; and
a rotor rotatably arranged on an inner circumferential side of the armature with a gap interposed therebetween, wherein
the armature includes an armature core, armature coils mounted to the armature core, and phase to phase insulators for insulating coil end parts of the armature coils,
the armature coils are formed such that (4n+2) number of slot accommodation portions of single coils forming the armature coils are arranged so as to be stacked in a radial direction in slots of the armature core, n being a natural number,
in each single coil, the slot accommodation portions forming the first to (4n+2)th layers are formed by one continuous conductive wire,
on an anti-wire-connection side, coil ends extending in a circumferential direction from the slot accommodation portions in the (4n)th layer and the (4n+1)th layer extend toward the same direction as a coil end extending in the circumferential direction from the slot accommodation portion in the first layer, coil ends extending in the circumferential direction from the slot accommodation portions in the second layer, the (4n−1)th layer, and the (4n+2)th layer extend toward a direction opposite to the coil end extending in the circumferential direction from the slot accommodation portion in the first layer, and
the phase to phase insulators are provided between the coil ends that extend toward directions opposite to each other in the circumferential direction and are adjacent in the radial direction, and the phase to phase insulator is not provided between the coil ends that extend toward the same direction in the circumferential direction and are adjacent in the radial direction.

6. The rotating electric machine according to claim 5, wherein
each single coil is formed such that the slot accommodation portions forming the first layer and the (4n+1)th layer are located at one end in the circumferential direction, the slot accommodation portions forming the second layer, the (4n)th layer, and the (4n+2)th layer are located at a center in the circumferential direction, and the slot accommodation portion forming the (4n−1)th layer is located at the other end in the circumferential direction,
a pair of the slot accommodation portion in the first layer and the slot accommodation portion in the second layer, a pair of the slot accommodation portion in the (4n−1)th layer and the slot accommodation portion in the (4n)th layer, and a pair of the slot accommodation portion in the (4n+1)th layer and the slot accommodation portion in the (4n+2)th layer, each pair of the slot accommodation portions being shifted from each other by one layer in the radial direction, is respectively connected by connection portions as the coil ends on the anti-wire-connection side, and
a pair of the slot accommodation portion in the second layer and the slot accommodation portion in the third layer, a pair of the slot accommodation portion in the (4n)th layer and the slot accommodation portion in the (4n+1)th layer, and a pair of the slot accommodation portion in the (4n+2)th layer other than the outermost layer and the slot accommodation portion in the (4n−1)th layer other than the third layer, each pair of the slot accommodation portions being shifted from each other by one layer in the radial direction, is respectively connected by connection portions as the coil ends on the wire-connection side.

7. The rotating electric machine according to claim 5, wherein
each single coil is formed such that the slot accommodation portions forming the (4n)th layer are located at one end in the circumferential direction, the slot accommodation portions forming the first layer, the (4n−1)th layer, and the (4n+1)th layer are located at a center in the circumferential direction, and the slot accommodation portions forming the second layer and the (4n+2)th layer are located at the other end in the circumferential direction,
a pair of the slot accommodation portion in the first layer and the slot accommodation portion in the second layer, a pair of the slot accommodation portion in the (4n−1)th layer and the slot accommodation portion in the (4n)th layer, and a pair of the slot accommodation portion in the (4n+1)th layer and the slot accommodation portion in the (4n+2)th layer, each pair of the slot accommodation portions being shifted from each other by one layer in the radial direction, are respectively connected by connection portions as the coil ends on the anti-wire-connection side, and a pair of the slot accommodation portion in the second layer and the slot accommodation portion in the third layer, a pair of the slot accommodation portion in the (4n)th layer and the slot accommodation portion in the (4n+1)th layer, and a pair of the slot accommodation portion in the (4n+2)th layer other than the outermost layer and the slot accommodation portion in the (4n−1)th layer other than the third layer, each pair of the slot accommodation portions being shifted from each other by one layer in the radial direction, is respectively connected by connection portions as the coil end on a wire-connection side.

* * * * *